(12) United States Patent
Quan et al.

(10) Patent No.: US 11,006,410 B2
(45) Date of Patent: May 11, 2021

(54) METHOD AND APPARATUS FOR TRANSMITTING UPLINK INFORMATION

(71) Applicant: Huawei Technologies Co., Ltd., Shenzhen (CN)

(72) Inventors: Wei Quan, Beijing (CN); Xiaodong Yang, Shenzhen (CN); Zhenxing Hu, Shenzhen (CN); Jian Zhang, Beijing (CN); Pengyu Ji, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/445,573

(22) Filed: Jun. 19, 2019

(65) Prior Publication Data
US 2019/0306859 A1 Oct. 3, 2019

Related U.S. Application Data

(63) Continuation of application No. 15/783,163, filed on Oct. 13, 2017, now Pat. No. 10,356,780, which is a
(Continued)

(51) Int. Cl.
*H04W 72/04* (2009.01)
*H04L 5/00* (2006.01)
(Continued)

(52) U.S. Cl.
CPC ........... *H04W 72/0446* (2013.01); *H04L 5/00* (2013.01); *H04L 5/0092* (2013.01); *H04L 5/14* (2013.01);
(Continued)

(58) Field of Classification Search
CPC ......... H04W 72/0446; H04W 72/0413; H04W 72/042; H04L 5/00; H04L 5/0092; H04L 5/1469
See application file for complete search history.

(56) References Cited

U.S. PATENT DOCUMENTS

| 2010/0331030 A1 | 12/2010 | Nory et al. |
| 2011/0176461 A1 | 7/2011 | Astely et al. |

(Continued)

FOREIGN PATENT DOCUMENTS

| CN | 102624490 A | 8/2012 |
| CN | 102651662 A | 8/2012 |

(Continued)

OTHER PUBLICATIONS

LTE, 3rd Generation Partnership Project; Technical Specification Group Radio Access Network; Evolved Universal Terrestrial Radio Access (E-UTRA); Physical Layer Procedures (Release 11), 3GPP TS 36.213 v11.3.0, Jun. 2013, 176 pages.
(Continued)

*Primary Examiner* — Shukri Taha
(74) *Attorney, Agent, or Firm* — Slater Matsil, LLP

(57) ABSTRACT

A method and an apparatus for transmitting uplink information, the method including configuring, by a base station, a flexible subframe for a user equipment (UE), where the flexible subframe is a subframe in which the base station is configured to receive or transmit data according to a time division duplex (TDD) uplink-downlink subframe configuration of the subframe, and sending, by the base station, resource configuration indication information and subframe configuration indication information to the UE, where the resource configuration indication information indicates the flexible subframe and a subframe direction to which the flexible subframe currently needs to be applied, where the subframe direction is a direction of transmission with respect to the base station, and where the subframe configuration indication information instructs the UE to transmit uplink information according to the subframe configuration indication information.

18 Claims, 5 Drawing Sheets

```
Receive second subframe configuration indication information sent from the     170
base station, where the second subframe configuration indication information
indicates that a subframe direction to which a flexible subframe currently needs
                     to be applied is downlink
                               ↓
Determine, according to the second subframe configuration indication           180
information, that the flexible subframe included in the receive window of the
       random access response RAR message is a downlink subframe
                               ↓
Detect, in the flexible subframe included in the receive window, the RAR       185
              message sent from the base station
```

Related U.S. Application Data continuation of application No. 14/923,080, filed on Oct. 26, 2015, now Pat. No. 9,832,770, which is a continuation of application No. PCT/CN2013/082155, filed on Aug. 23, 2013.

(51) Int. Cl.
  *H04L 5/14* (2006.01)
  *H04W 88/02* (2009.01)

(52) U.S. Cl.
  CPC ....... *H04L 5/1469* (2013.01); *H04W 72/0413* (2013.01); *H04L 5/0048* (2013.01); *H04W 88/02* (2013.01)

(56) References Cited

U.S. PATENT DOCUMENTS

| | | | |
|---|---|---|---|
| 2013/0188516 A1 | 7/2013 | He et al. | |
| 2013/0188533 A1 | 7/2013 | He et al. | |
| 2014/0010127 A1 | 1/2014 | Cheng et al. | |
| 2014/0029486 A1 | 1/2014 | Li et al. | |
| 2014/0064206 A1* | 3/2014 | Bao | H04W 72/1278 370/329 |
| 2014/0204807 A1* | 7/2014 | Li | H04W 72/082 370/277 |
| 2014/0301255 A1* | 10/2014 | Yin | H04L 5/0092 370/280 |
| 2015/0055584 A1 | 2/2015 | Lee et al. | |
| 2015/0188690 A1* | 7/2015 | Khoryaev | H04L 5/0051 370/280 |
| 2015/0312937 A1* | 10/2015 | Suzuki | H04B 7/2656 370/255 |
| 2015/0333893 A1 | 11/2015 | Lee et al. | |
| 2016/0119101 A1* | 4/2016 | Liu | H04L 5/0057 370/280 |
| 2016/0183308 A1 | 6/2016 | Eriksson et al. | |
| 2016/0192369 A1 | 6/2016 | Suzuki et al. | |

FOREIGN PATENT DOCUMENTS

| | | |
|---|---|---|
| CN | 102740477 A | 10/2012 |
| EP | 2693679 A1 | 2/2014 |
| RU | 2012102387 A | 7/2013 |
| WO | 2010049587 A1 | 5/2010 |
| WO | 2012130179 A1 | 10/2012 |

OTHER PUBLICATIONS

LTE, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; stage 2 (Release 11)," 3GPP TS 36.300 v11.6.0, Jun. 2013, 209 pages.

LTE, 3rd Generation Partnership Project; Technical Specification Group Radio Access Network; Evolved Universal Terrestrial Radio Access (E-UTRA); User Equipment (UE) Radio Access Capabilities (Release 11), 3GPP TS 36.306 v11.3.0, Mar. 2013, 27 pages.

LTE, "3rd Generation Partnership Project; Technical Specification Group Radio Access Network; Evolved Universal Terrestrial Radio Access (E-UTRA); Medium Accedd Control (MAC) Protocol Specification (Release 11)," 3GPP TS 36.321 v11.3.0, Jun. 2013, 57 pages.

LTE, 3rd Generation Partnership Project; Technical Specification Group Radio Access Network; Evolved Universal Terrestrial Radio Access (E-UTRA); Radio Resource Control (RRC); Protocol Specification (Release 11), 3GPP TS 36.331 v11.4.0, Jun. 2013, 346 pages.

"HARQ Aspect for TDD eIMTA," Source: Intel Corporation, Agenda Item: 7.2.3.3, Document for: Discussion and Decision, 3GPP TSG-RAN WG1 #74, R1-132927, Barcelona, Spain, Aug. 19-23, 2013, 4 pages.

"Signaling for TDD UL-DL Reconfiguration," Source: Samsung, Agenda Item: 7.2.3.2, Discussion and Decision, 3GPP TSG RAN WG1 Meeting #74, R1-133094, Barcelona, Spain, Aug. 19-23, 2013, 4 pages.

"Comparison of HARQ-ACK Timing Approaches for eIMTA Cell," Source: Sharp, Agenda Item: 7.2.3.3, Document for: Discussion and Decision, 3GPP TSG RAN WG1 Meeting #74, R1-133230, Barcelona, Spain, Aug. 19-23, 2013, 4 pages.

\* cited by examiner

METHOD AND APPARATUS FOR TRANSMITTING UPLINK INFORMATION

CROSS-REFERENCE TO RELATED APPLICATIONS

This application is a continuation of U.S. patent application Ser. No. 15/783,163, filed on Oct. 13, 2017, which is a continuation of U.S. patent application Ser. No. 14/923,080, filed on Oct. 26, 2015, now U.S. Pat. No. 9,832,770, which is a continuation of International Application No. PCT/CN2013/082155, filed on Aug. 23, 2013. All of the aforementioned patent applications are hereby incorporated by reference in their entireties.

TECHNICAL FIELD

Embodiments of the present invention relate to the communications field, and more specifically, to a method and an apparatus for transmitting uplink information.

BACKGROUND

An LTE system supports two duplex modes, that is, a frequency division duplex (FDD) mode and a time division duplex (TDD) mode. In a TDD system, time resources are allocated in an uplink direction and a downlink direction, and the TDD system supports seven different TDD uplink-downlink subframe ratios. A network side may configure one of the seven TDD uplink-downlink subframe ratios for a cell according to a feature such as a service of the cell. Configuration information of a TDD uplink-downlink subframe ratio is included in system information block 1 (SIB1) of a broadcast message, and a user equipment (UE) under coverage of a cell may obtain a TDD uplink-downlink subframe ratio configuration of the cell by reading system information block 1 of the broadcast message.

If the foregoing TDD uplink-downlink subframe ratio can flexibly change, when a base station performs resource configuration of uplink information, such as a physical random access channel (PRACH), a scheduling request (SR), a channel quality indicator (CQI), and a sounding reference signal (SRS), uplink resources of the UE are configured to a constant uplink subframe, so that a quantity of uplink subframes that are actually available to the UE becomes smaller, and the uplink resources cannot be flexibly configured for the UE that supports a flexible subframe, thereby reducing flexibility in sending a CQI, a SR, and a SRS over an uplink, and increasing a random access delay.

SUMMARY

Embodiments of the present invention provide a method and an apparatus for transmitting uplink information, which can improve an uplink resource utilization rate.

According to a first aspect, a method for transmitting uplink information is provided, where the method includes receiving resource configuration indication information and first subframe configuration indication information that are sent from a base station, where the resource configuration indication information is used to indicate at least one flexible subframe, the flexible subframe includes a subframe whose subframe direction can be changed when the base station configures at least one time division duplex (TDD) uplink-downlink subframe ratio configuration for a user equipment (UE), and the first subframe configuration indication information is used to indicate a subframe direction to which the flexible subframe currently needs to be applied, and determining, according to the first subframe configuration indication information, whether to transmit uplink information in the flexible subframe.

With reference to the first aspect, in a first possible implementation manner, that the resource configuration indication information is used to indicate at least one flexible subframe includes that the resource configuration indication information is used to indicate at least two TDD uplink-downlink subframe ratio configurations that are configured for the UE, where the at least two TDD uplink-downlink subframe ratio configurations include a first uplink-downlink subframe ratio configuration and a second uplink-downlink subframe ratio configuration, and when a first subframe is respectively configured as an uplink subframe and a downlink subframe in the first uplink-downlink subframe ratio configuration and the second uplink-downlink subframe ratio configuration, the first subframe is the flexible subframe.

With reference to the first aspect or with reference to the first possible implementation manner of the first aspect, in a second possible implementation manner, that the first subframe configuration indication information is used to indicate a subframe direction to which the flexible subframe currently needs to be applied includes that the first subframe configuration indication information is used to indicate a TDD uplink-downlink subframe ratio configuration that currently needs to be used when the base station configures at least two TDD uplink-downlink subframe ratio configurations for the UE, where the TDD uplink-downlink subframe ratio configuration that currently needs to be used includes the subframe direction to which the flexible subframe currently needs to be applied.

With reference to the first aspect or with reference to the first possible implementation manner of the first aspect, in a third possible implementation manner, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures one TDD uplink-downlink subframe ratio configuration for the UE.

With reference to the first aspect or with reference to the first possible implementation manner of the first aspect, in a fourth possible implementation manner, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures at least two TDD uplink-downlink subframe ratio configurations for the UE and the first subframe configuration indication information is further used to indicate a TDD uplink-downlink subframe ratio configuration that currently needs to be used.

With reference to the first aspect or with reference to any possible implementation manner of the first to the fourth possible implementation manners of the first aspect, in a fifth possible implementation manner, the determining, according to the first subframe configuration indication information, whether to transmit uplink information in the flexible subframe includes determining, according to the first subframe configuration indication information, that the flexible subframe is an uplink subframe, and determining to transmit the uplink information in the flexible subframe.

With reference to the fifth possible implementation manner of the first aspect, in a sixth possible implementation manner, the method further includes using the flexible subframe to carry the uplink information, and sending the uplink information to the base station by using the flexible subframe.

With reference to the first aspect or with reference to any possible implementation manner of the first to the fourth possible implementation manners of the first aspect, in a seventh possible implementation manner, the determining, according to the first subframe configuration indication information, whether to transmit uplink information in the flexible subframe includes determining, according to the first subframe configuration indication information, that the flexible subframe is a downlink subframe, and determining not to transmit the uplink information in the flexible subframe.

With reference to the seventh possible implementation manner of the first aspect, in an eighth possible implementation manner, the method further includes using another uplink subframe except the flexible subframe in a TDD uplink-downlink subframe ratio indicated by the TDD uplink-downlink subframe ratio configuration to carry the uplink information, and sending the uplink information to the base station by using the another uplink subframe.

With reference to the first aspect or with reference to any possible implementation manner of the first to the eighth possible implementation manners of the first aspect, in a ninth possible implementation manner, the uplink information includes at least one of the following: a scheduling request (SR), a channel quality indicator (CQI), a sounding reference signal (SRS), and a physical random access channel (PRACH).

With reference to the sixth possible implementation manner of the first aspect, in a tenth possible implementation manner, the uplink information includes a physical random access channel PRACH, and the method further includes receiving second subframe configuration indication information sent from the base station, where the second subframe configuration indication information indicates that a subframe direction to which a flexible subframe currently needs to be applied is downlink, where the flexible subframe is included in a receive window of a random access response RAR message, determining, according to the second subframe configuration indication information, that the flexible subframe included in the receive window of the random access response RAR message is a downlink subframe, and detecting, in the flexible subframe included in the receive window, the RAR message sent from the base station.

With reference to the first aspect or with reference to any possible implementation manner of the first to the tenth possible implementation manners of the first aspect, in an eleventh possible implementation manner, the method further includes when the first subframe configuration indication information periodically sent from the base station by using a first sending period as a time interval is not received at a first period time, determining not to transmit the uplink information in the flexible subframe before a second period time, where a time interval between the first period time and the second period time is the first sending period.

With reference to the first aspect or with reference to any possible implementation manner of the first to the eleventh possible implementation manners of the first aspect, in a twelfth possible implementation manner, the receiving resource configuration indication information sent from a base station includes receiving dedicated signaling sent from the base station, where the dedicated signaling carries the resource configuration indication information, or receiving broadcast signaling sent from the base station, where the broadcast signaling carries the resource configuration indication information.

With reference to the first aspect or with reference to any possible implementation manner of the first to the twelfth possible implementation manners of the first aspect, in a thirteenth possible implementation manner, before the receiving resource configuration indication information sent from a base station, the method further includes sending capability information of the UE to the base station, where the capability information of the UE includes a capability about whether the UE supports a flexible subframe, and the capability information of the UE is used to instruct the base station to configure the flexible subframe for the UE according to the capability information of the UE.

According to a second aspect, a method for transmitting uplink information is provided, where the method includes configuring at least one flexible subframe for a user equipment UE, where the flexible subframe includes a subframe whose subframe direction can be changed when a base station configures at least one time division duplex TDD uplink-downlink subframe ratio configuration for the UE, and sending resource configuration indication information and first subframe configuration indication information to the UE, where the resource configuration indication information is used to indicate the at least one flexible subframe, the first subframe configuration indication information is used to indicate a subframe direction to which the flexible subframe currently needs to be applied, and the first subframe configuration indication information is used to instruct the UE to transmit uplink information according to the first subframe configuration indication information.

With reference to the second aspect, in a first possible implementation manner, that the resource configuration indication information is used to indicate the at least one flexible subframe includes that the resource configuration indication information is used to indicate at least two TDD uplink-downlink subframe ratio configurations that are configured for the UE, where the at least two TDD uplink-downlink subframe ratio configurations include a first uplink-downlink subframe ratio configuration and a second uplink-downlink subframe ratio configuration, and when a first subframe is respectively configured as an uplink subframe and a downlink subframe in the first uplink-downlink subframe ratio configuration and the second uplink-downlink subframe ratio configuration, the first subframe is the flexible subframe.

With reference to the second aspect or with reference to the first possible implementation manner of the second aspect, in a second possible implementation manner, that the first subframe configuration indication information is used to indicate a subframe direction to which the flexible subframe currently needs to be applied includes that the first subframe configuration indication information is used to indicate a TDD uplink-downlink subframe ratio configuration that currently needs to be used when the base station configures at least two TDD uplink-downlink subframe ratio configurations for the UE, where the TDD uplink-downlink subframe ratio configuration that currently needs to be used includes the subframe direction to which the flexible subframe currently needs to be applied.

With reference to the second aspect or with reference to the first possible implementation manner of the second aspect, in a third possible implementation manner, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures one TDD uplink-downlink subframe ratio configuration for the UE.

With reference to the second aspect or with reference to the first possible implementation manner of the second aspect, in a fourth possible implementation manner, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures at least two TDD uplink-downlink subframe ratio configurations for the UE, and the first subframe configuration indication information is further used to indicate a TDD uplink-downlink subframe ratio configuration that currently needs to be used.

With reference to the second aspect or with reference to any possible implementation manner of the first to the fourth possible implementation manners of the second aspect, in a fifth possible implementation manner, the method further includes when the first subframe configuration indication information indicates that the subframe direction to which the flexible subframe currently needs to be applied is uplink, receiving the uplink information sent from the UE in the flexible subframe.

With reference to the second aspect or with reference to any possible implementation manner of the first to the fifth possible implementation manners of the second aspect, in a sixth possible implementation manner, the method further includes when the first subframe configuration indication information indicates that the subframe direction to which the flexible subframe currently needs to be applied is downlink, receiving the uplink information sent from the UE in another uplink subframe except the flexible subframe in a TDD uplink-downlink subframe ratio indicated by the TDD uplink-downlink subframe ratio configuration.

With reference to the second aspect or with reference to any possible implementation manner of the first to the sixth possible implementation manners of the second aspect, in a seventh possible implementation manner, the uplink information includes at least one of the following a scheduling request (SR), a channel quality indicator (CQI), a sounding reference signal (SRS), and a physical random access channel (PRACH).

With reference to the fifth possible implementation manner of the second aspect, in an eighth possible implementation manner, the method further includes when the received uplink information includes a physical random access channel PRACH, sending second subframe configuration indication information to the UE, where the second subframe configuration indication information is used to indicate that a subframe direction to which a flexible subframe currently needs to be applied is downlink, where the flexible subframe is included in a receive window of a random access response RAR message, and the second subframe configuration indication information is used to instruct the UE to detect, according to the second subframe configuration indication information, the RAR message in the flexible subframe included in the receive window, and sending the RAR message to the UE in the flexible subframe included in the receive window.

With reference to the second aspect or with reference to any possible implementation manner of the first to the eighth possible implementation manners of the second aspect, in a ninth possible implementation manner, the sending resource configuration indication information to the UE includes sending dedicated signaling to the UE, where the dedicated signaling carries the resource configuration indication information, or sending broadcast signaling to the UE, where the broadcast signaling carries the resource configuration indication information.

With reference to the second aspect or with reference to any possible implementation manner of the first to the ninth possible implementation manners of the second aspect, in a tenth possible implementation manner, before the configuring at least one flexible subframe for a user equipment UE, the method further includes receiving capability information of the UE sent from the UE, where the capability information of the UE includes a capability about whether the UE supports a flexible subframe, and the configuring at least one flexible subframe for a user equipment UE includes configuring the at least one flexible subframe for the UE according to the capability information of the UE.

According to a third aspect, an apparatus for transmitting uplink information is provided, where the apparatus includes a receiving module, configured to receive resource configuration indication information and first subframe configuration indication information that are sent from a base station, where the resource configuration indication information is used to indicate at least one flexible subframe, the flexible subframe includes a subframe whose subframe direction can be changed when the base station configures at least one time division duplex TDD uplink-downlink subframe ratio configuration for a user equipment UE, and the first subframe configuration indication information is used to indicate a subframe direction to which the flexible subframe currently needs to be applied, and a determining module, configured to determine, according to the first subframe configuration indication information received by the receiving module, whether to transmit uplink information in the flexible subframe indicated by the resource configuration indication information that is received by the receiving module.

With reference to the third aspect, in a first possible implementation manner, that the resource configuration indication information is used to indicate at least one flexible subframe includes that the resource configuration indication information is used to indicate at least two TDD uplink-downlink subframe ratio configurations that are configured for the UE, where the at least two TDD uplink-downlink subframe ratio configurations include a first uplink-downlink subframe ratio configuration and a second uplink-downlink subframe ratio configuration, and when a first subframe is respectively configured as an uplink subframe and a downlink subframe in the first uplink-downlink subframe ratio configuration and the second uplink-downlink subframe ratio configuration, the first subframe is the flexible subframe.

With reference to the third aspect or with reference to the first possible implementation manner of the third aspect, in a second possible implementation manner, that the first subframe configuration indication information is used to indicate a subframe direction to which the flexible subframe currently needs to be applied includes that the first subframe configuration indication information is used to indicate a TDD uplink-downlink subframe ratio configuration that currently needs to be used when the base station configures at least two TDD uplink-downlink subframe ratio configurations for the UE, where the TDD uplink-downlink subframe ratio configuration that currently needs to be used includes the subframe direction to which the flexible subframe currently needs to be applied.

With reference to the third aspect or with reference to the first possible implementation manner of the third aspect, in a third possible implementation manner, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures one TDD uplink-downlink subframe ratio configuration for the UE.

With reference to the third aspect or with reference to the first possible implementation manner of the third aspect, in a fourth possible implementation manner, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures at least two TDD uplink-downlink subframe ratio configurations for the UE, and the first subframe configuration indication information is further used to indicate a TDD uplink-downlink subframe ratio configuration that currently needs to be used.

With reference to the third aspect or with reference to any possible implementation manner of the first to the fourth possible implementation manners of the third aspect, in a fifth possible implementation manner, the determining module is specifically configured to determine, according to the first subframe configuration indication information received by the receiving module, that the flexible subframe is an uplink subframe, and determine to transmit the uplink information in the flexible subframe.

With reference to the fifth possible implementation manner of the third aspect, in a sixth possible implementation manner, the apparatus further includes a first carrying module, configured to use the flexible subframe to carry the uplink information, and a first sending module, configured to send, to the base station by using the flexible subframe, the uplink information carried by the first carrying module.

With reference to the third aspect or with reference to any possible implementation manner of the first to the fourth possible implementation manners of the third aspect, in a seventh possible implementation manner, the determining module is specifically configured to determine, according to the first subframe configuration indication information received by the receiving module, that the flexible subframe is a downlink subframe, and determine not to transmit the uplink information in the flexible subframe.

With reference to the seventh possible implementation manner of the third aspect, in an eighth possible implementation manner, the apparatus further includes a second carrying module, configured to use the another uplink subframe except the flexible subframe in a TDD uplink-downlink subframe ratio indicated by the TDD uplink-downlink subframe ratio configuration to carry uplink information, and a second sending module, configured to send, to the base station by using the another uplink subframe, the uplink information carried by the second carrying module.

With reference to the third aspect or with reference to any possible implementation manner of the first to the eighth possible implementation manners of the third aspect, in a ninth possible implementation manner, the uplink information includes at least one of the following: a scheduling request (SR), a channel quality indicator (CQI), a sounding reference signal (SRS), and a physical random access channel (PRACH).

With reference to the sixth possible implementation manner of the third aspect, in a tenth possible implementation manner, the uplink information includes a physical random access channel (PRACH), the receiving module is further configured to receive second subframe configuration indication information sent from the base station, where the second subframe configuration indication information indicates that a subframe direction to which a flexible subframe currently needs to be applied is downlink, where the flexible subframe is included in a receive window of a random access response (RAR) message, the determining module is further configured to determine, according to the second subframe configuration indication information received by the receiving module, that the flexible subframe included in the receive window of the random access response (RAR) message is a downlink subframe, and the apparatus further includes a detecting module, configured to detect, in the flexible subframe that is included in the receive window and is determined by the determining module as a downlink subframe, the RAR message sent from the base station.

With reference to the third aspect or with reference to any possible implementation manner of the first to the tenth possible implementation manners of the third aspect, in an eleventh possible implementation manner, the determining module is further configured to when the receiving module does not receive the first subframe configuration indication information at a first period time periodically sent from the base station by using a first sending period as a time interval, determine not to transmit the uplink information in the flexible subframe before a second period time, where a time interval between the first period time and the second period time is the first sending period.

With reference to the third aspect or with reference to any possible implementation manner of the first to the eleventh possible implementation manners of the third aspect, in a twelfth possible implementation manner, the receiving module is specifically configured to receive dedicated signaling sent from the base station, where the dedicated signaling carries the resource configuration indication information, or receive broadcast signaling sent from the base station, where the broadcast signaling carries the resource configuration indication information.

With reference to the third aspect or with reference to any possible implementation manner of the first to the twelfth possible implementation manners of the third aspect, in a thirteenth possible implementation manner, the apparatus further includes a third sending module, configured to before the receiving module receives the resource configuration indication information sent from the base station, send capability information of the UE to the base station, where the capability information of the UE includes a capability about whether the UE supports a flexible subframe, and the capability information of the UE is used to instruct the base station to configure the flexible subframe for the UE according to the capability information of the UE.

According to a fourth aspect, an apparatus for transmitting uplink information is provided, where the apparatus includes a configuring module, configured to configure at least one flexible subframe for a user equipment UE, where the flexible subframe includes a subframe whose subframe direction can be changed when a base station configures at least one time division duplex TDD uplink-downlink subframe ratio configuration for the UE, and a sending module, configured to send resource configuration indication information and first subframe configuration indication information to the UE, where the resource configuration indication information is used to indicate the at least one flexible subframe configured by the configuring module, the first subframe configuration indication information is used to indicate a subframe direction to which the flexible subframe currently needs to be applied, and the first subframe configuration indication information is used to instruct the UE to transmit uplink information according to the first subframe configuration indication information.

With reference to the fourth aspect, in a first possible implementation manner, that the resource configuration indication information is used to indicate the at least one flexible subframe includes that the resource configuration indication information is used to indicate at least two TDD uplink-downlink subframe ratio configurations that are configured for the UE, where the at least two TDD uplink-downlink subframe ratio configurations include a first uplink-downlink subframe ratio configuration and a second uplink-downlink subframe ratio configuration, and when a first subframe is respectively configured as an uplink subframe and a downlink subframe in the first uplink-downlink subframe ratio configuration and the second uplink-downlink subframe ratio configuration, the first subframe is the flexible subframe.

With reference to the fourth aspect or with reference to the first possible implementation manner of the fourth aspect, in a second possible implementation manner, that the first subframe configuration indication information is used to indicate a subframe direction to which the flexible subframe currently needs to be applied includes that the first subframe configuration indication information is used to indicate a TDD uplink-downlink subframe ratio configuration that currently needs to be used when the base station configures at least two TDD uplink-downlink subframe ratio configurations for the UE, where the TDD uplink-downlink subframe ratio configuration that currently needs to be used includes the subframe direction to which the flexible subframe currently needs to be applied.

With reference to the fourth aspect or with reference to the first possible implementation manner of the fourth aspect, in a third possible implementation manner, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures one TDD uplink-downlink subframe ratio configuration for the UE.

With reference to the fourth aspect or with reference to the first possible implementation manner of the fourth aspect, in a fourth possible implementation manner, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures at least two TDD uplink-downlink subframe ratio configurations for the UE, and the first subframe configuration indication information is further used to indicate a TDD uplink-downlink subframe ratio configuration that currently needs to be used.

With reference to the fourth aspect or with reference to any possible implementation manner of the first to the fourth possible implementation manners of the fourth aspect, in a fifth possible implementation manner, the apparatus further includes a first receiving module, configured to, when the first subframe configuration indication information sent from the sending module indicates that the subframe direction to which the flexible subframe currently needs to be applied is uplink, receive the uplink information sent from the UE in the flexible subframe.

With reference to the fourth aspect or with reference to any possible implementation manner of the first to the fifth possible implementation manners of the fourth aspect, in a sixth possible implementation manner, the apparatus further includes a second receiving module, configured to when the first subframe configuration indication information sent from the sending module indicates that the subframe direction to which the flexible subframe currently needs to be applied is downlink, receive the uplink information sent from the UE in another uplink subframe except the flexible subframe in a TDD uplink-downlink subframe ratio indicated by the TDD uplink-downlink subframe ratio configuration.

With reference to the fourth aspect or with reference to any possible implementation manner of the first to the sixth possible implementation manners of the fourth aspect, in a seventh possible implementation manner, the uplink information includes at least one of the following: a scheduling request (SR), a channel quality indicator (CQI), a sounding reference signal (SRS), and a physical random access channel (PRACH).

With reference to the fifth possible implementation manner of the fourth aspect, in an eighth possible implementation manner, the sending module is further configured to when the uplink information received by the first receiving module includes a physical random access channel PRACH, send second subframe configuration indication information to the UE, where the second subframe configuration indication information is used to indicate that a subframe direction to which a flexible subframe currently needs to be applied is downlink, where the flexible subframe is included in a receive window of a random access response RAR message, and the second subframe configuration indication information is used to instruct the UE to detect, according to the second subframe configuration indication information, the RAR message in the flexible subframe included in the receive window, and the sending module is further configured to send the RAR message to the UE in the flexible subframe included in the receive window.

With reference to the fourth aspect or with reference to any possible implementation manner of the first to the eighth possible implementation manners of the fourth aspect, in a ninth possible implementation manner, the sending module is specifically configured to send dedicated signaling to the UE, where the dedicated signaling carries the resource configuration indication information, or send broadcast signaling to the UE, where the broadcast signaling carries the resource configuration indication information.

With reference to the fourth aspect or with reference to any possible implementation manner of the first to the ninth possible implementation manners of the fourth aspect, in a tenth possible implementation manner, the apparatus further includes a third receiving module, configured to before the configuring module configures the at least one flexible subframe for the UE, receive capability information of the UE sent from the UE, where the capability information of the UE includes a capability about whether the UE supports a flexible subframe, and the configuring module is specifically configured to configure the at least one flexible subframe for the UE according to the capability information of the UE received by the third receiving module.

According to a fifth aspect, an apparatus for transmitting uplink information is provided, where the apparatus includes a receiver, configured to receive resource configuration indication information and first subframe configuration indication information that are sent from a base station, where the resource configuration indication information is used to indicate at least one flexible subframe, the flexible subframe includes a subframe whose subframe direction can be changed when the base station configures at least one time division duplex TDD uplink-downlink subframe ratio configuration for a user equipment UE, and the first subframe configuration indication information is used to indicate a subframe direction to which the flexible subframe currently needs to be applied, and a processor, configured to determine, according to the first subframe configuration indication information received by the receiver, whether to transmit uplink information in the flexible subframe indicated by the resource configuration indication information that is received by the receiver.

According to a sixth aspect, an apparatus for transmitting uplink information is provided, where the apparatus includes a processor, configured to configure at least one flexible subframe for a user equipment UE, where the flexible subframe includes a subframe whose subframe direction can be changed when a base station configures at least one time division duplex TDD uplink-downlink subframe ratio configuration for the UE, and a transmitter, configured to send resource configuration indication information and first subframe configuration indication information to the UE, where the resource configuration indication information is used to indicate the at least one flexible subframe configured by the processor, the first subframe configuration indication information is used to indicate a subframe direction to which the flexible subframe currently needs to be applied, and the first subframe configuration indication information is used to instruct the UE to transmit uplink information according to the first subframe configuration indication information.

Based on the foregoing technical solutions, according to the method and the apparatus for transmitting uplink information in the embodiments of the present invention, an uplink resource configured by a base station for a UE that supports a flexible subframe ratio includes at least one flexible subframe, instead of excluding the flexible subframe, so that uplink resources available to the UE increase. Therefore, uplink resource use can be balanced, an uplink resource utilization rate can be improved, and system performance and user experience can be improved. In addition, according to the method and the apparatus for transmitting uplink information in the embodiments of the present invention, uplink subframes that are actually available to the UE increase, and the flexible subframe is used with another uplink subframe, so that an uplink resource can be flexibly configured for the UE that supports a flexible subframe, thereby increasing flexibility in sending an uplink CQI, an uplink SR, and an uplink SRS, and reducing a random access delay.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), or a Worldwide Interoperability for Microwave Access (WiMAX) communications system.

It should also be understood that in the embodiments of the present invention, a user equipment (UE) may be referred to as a terminal, a mobile station (MS), a mobile terminal, or the like. The user equipment may communicate with one or more core networks by using a radio access network (RAN). For example, the user equipment may be a mobile phone (or referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

It should also be understood that in the embodiments of the present invention, the base station may be a base station (BTS) in the GSM or the CDMA, or may be a base station (NodeB) in the WCDMA, or may be an evolved NodeB (eNB or e-NodeB) in the LTE, which is not limited in the present invention.

Figure 1:
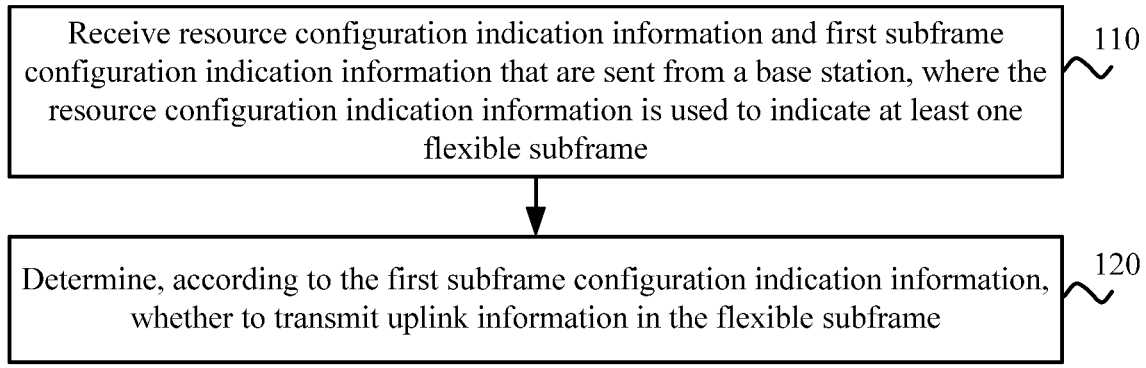
FIG. 1 is a schematic flowchart of a method for transmitting uplink information according to an embodiment of the present invention.

FIG. 1 is a schematic flowchart of a method 100 for transmitting uplink information according to an embodiment of the present invention. The method may be executed by any proper apparatus. For ease of description, an example in which the method is executed by a user equipment UE is used for description in the following. However, this embodiment of the present invention is not limited thereto. As shown in FIG. 1, the method 100 includes the following steps.

S110. Receive resource configuration indication information and first subframe configuration indication information that are sent from a base station, where the resource configuration indication information is used to indicate at least one flexible subframe, the flexible subframe includes a subframe whose subframe direction can be changed when the base station configures at least one time division duplex TDD uplink-downlink subframe ratio configuration for the user equipment UE, and the first subframe configuration indication information is used to indicate a subframe direction to which the flexible subframe currently needs to be applied.

S120. Determine, according to the first subframe configuration indication information, whether to transmit uplink information in the flexible subframe.

Therefore, according to the method for transmitting uplink information in this embodiment of the present invention, an uplink resource configured by a base station for a UE that supports a flexible subframe ratio includes at least one flexible subframe, instead of excluding the flexible subframe, so that uplink resources available to the UE increase. Accordingly, uplink resource use can be balanced, an uplink resource utilization rate can be improved, and system performance and user experience can be improved. In another aspect, according to the method for transmitting uplink information in this embodiment of the present invention, uplink subframes that are actually available to the UE increase, and the flexible subframe is used with another uplink subframe, so that an uplink resource can be flexibly configured for the UE that supports a flexible subframe, thereby increasing flexibility in sending an uplink CQI, an uplink SR, and an uplink SRS, and reducing a random access delay.

In this embodiment of the present invention, the base station configures, for the UE that supports a flexible subframe, an uplink resource used to transmit the uplink information, where the uplink resource may be indicated by using the resource configuration indication information generated by the base station, the base station sends the resource configuration indication information to the UE. Optionally, the uplink information includes at least one of the following: a scheduling request (SR), a channel quality indicator (CQI), a sounding reference signal (SRS), and a physical random access channel (PRACH). Accordingly, when receiving the resource configuration indication information, the UE may store the resource configuration indication information, and when the uplink information needs to be transmitted, send the uplink information in the subframe indicated by the resource configuration indication information. The resource configuration indication information may be used to indicate the at least one flexible subframe. To ensure that the UE can determine whether to send the uplink information in the flexible subframe indicated by the resource configuration indication information, the base station may further send the first subframe configuration indication information to the UE, to indicate the subframe direction to which the flexible subframe currently needs to be applied. Accordingly, when needing to transmit uplink information, the UE may determine, according to the first subframe configuration indication information, whether the subframe direction to which the flexible subframe currently needs to be applied is uplink or downlink, and then determine whether to send the uplink information in the flexible subframe.

Optionally, the base station may send the resource configuration indication information and the first subframe configuration indication information together, or separately send the resource configuration indication information and the first subframe configuration indication information. Optionally, the base station may also send the first subframe configuration indication information to the UE at different moments, to indicate the subframe direction to which the flexible subframe currently needs to be applied. However, this embodiment of the present invention is not limited thereto.

Optionally, subframes that are flexible subframes may be predefined, or may be configured by the base station and notified to the UE by using signaling, where the base station may explicitly or implicitly indicate the subframes that are flexible subframes. An optional indication manner is as follows. The base station configures one TDD uplink-downlink subframe ratio configuration for the UE, and indicates a subframe that is in the TDD uplink-downlink subframe ratio configuration and is a flexible subframe. Another optional indication manner is as follows. The base station configures at least two TDD uplink-downlink subframe ratio configurations for the UE, and configures subframes with a same subframe number in the at least two TDD uplink-downlink subframe ratio configurations as flexible subframes, where different subframe directions are configured for the subframes, and a subframe direction of a subframe is uplink or downlink. Accordingly, the UE may compare configuration conditions of at least one subframe in the at least two TDD uplink-downlink subframe ratio configurations, and determine that subframes with a same subframe number in the at least two TDD uplink-downlink subframe ratio configurations are flexible subframes, where different subframe directions are configured for the subframes. Accordingly, that the resource configuration indication information is used to indicate at least one flexible subframe includes that the resource configuration indication information is used to indicate at least two TDD uplink-downlink subframe ratio configurations that are configured for the UE, where the at least two TDD uplink-downlink subframe ratio configurations include a first uplink-downlink subframe ratio configuration and a second uplink-downlink subframe ratio configuration, and when a first subframe is respectively configured as an uplink subframe and a downlink subframe in the first uplink-downlink subframe ratio configuration and the second uplink-downlink subframe ratio configuration, the first subframe is the flexible subframe.

Table 1 shows seven TDD uplink-downlink subframe ratio configurations in a TDD system, where "U" represents an uplink subframe, "D" represents a downlink subframe, and "S" represents a special subframe. When the base station configures, for the UE, two TDD uplink-downlink subframe ratio configurations, that is, configuration 0 and configuration 1, in configuration 0, both subframe 4 and subframe 9 are configured as "U", that is, uplink subframes, and in configuration 1, both subframe 4 and subframe 9 are configured as "D", that is, downlink subframes. Because subframe 4 and subframe 9 are respectively configured as uplink subframes and downlink subframes in configuration 0 and configuration 1, the UE may determine that subframe 4 and subframe 9 are flexible subframes.

TABLE 1

TDD uplink-downlink subframe ratio configuration in a TDD system

| TDD uplink-downlink subframe ratio configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Optionally subframe ratio configurations for the UE, and the flexible subframe has different subframe directions in the at least two TDD uplink-downlink subframe ratio configurations, by indicating, in the first subframe configuration indication information, a TDD uplink-downlink subframe ratio configuration that is in the at least two TDD uplink-downlink subframe ratio configurations and is to be used by the UE, the base station may indicate the subframe direction to which the flexible subframe currently needs to be applied. Accordingly, that the first subframe configuration indication information is used to indicate a subframe direction to which the flexible subframe currently needs to be applied includes that the first subframe configuration indication information is used to indicate a TDD uplink-downlink subframe ratio configuration that currently needs to be used when the base station configures at least two TDD uplink-downlink subframe ratio configurations for the UE, where the TDD uplink-downlink subframe ratio configuration that currently needs to be used includes the subframe direction to which the flexible subframe currently needs to be applied.

Optionally, in another embodiment, when the base station configures one TDD uplink-downlink subframe ratio configuration for the UE, the base station may indicate, in the first subframe ratio configuration, the subframe direction to which the flexible subframe currently needs to be applied. Accordingly, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures one TDD uplink-downlink subframe ratio configuration for the UE.

Optionally, in another embodiment, the base station may also adjust a constant subframe and a flexible subframe in real time according to a network status. For example, the base station adjusts some constant subframes as flexible subframes or adjusts some flexible subframes as constant subframes, where a constant subframe refers to a constant uplink subframe or a constant downlink subframe, and the constant subframe may have a same subframe direction in at least two TDD uplink-downlink subframe ratio configurations that are configured by the base station for the UE. However, this embodiment of the present invention is not limited thereto.

Optionally, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures at least two TDD uplink-downlink subframe ratio configurations for the UE, and the first subframe configuration indication information is further used to indicate a TDD uplink-downlink subframe ratio configuration that currently needs to be used.

Optionally, in another embodiment, the base station may further configure, for the UE, two sets of TDD uplink-downlink subframe ratio configurations used to send the foregoing uplink information, where one set of TDD uplink-downlink subframe ratio configuration includes only a constant subframe, and the other set of TDD uplink-downlink subframe ratio configuration includes only a flexible subframe. Accordingly, the first subframe configuration indication information may indicate one set of TDD uplink-downlink subframe ratio configuration to be used by the UE and indicate a subframe direction to which the flexible subframe currently needs to be applied. Accordingly, the first subframe configuration indication information is used to indicate a subframe direction to which the flexible subframe currently needs to be applied when the base station configures at least two TDD uplink-downlink subframe ratio configurations for the UE, and indicate a TDD uplink-downlink subframe ratio configuration that currently needs to be used.

Optionally, the base station and the UE may predefine all flexible subframes as uplink subframes. In this case, if the base station notifies the UE that a flexible subframe is a downlink subframe, the UE determines that the flexible subframe is a downlink subframe, if the base station does not notify the UE of whether the flexible subframe is an uplink subframe or a downlink subframe, the UE determines that the flexible subframe is an uplink subframe. Optionally, the base station and the UE may also predefine all flexible subframes as downlink subframes. Accordingly, if the base station notifies the UE that a flexible subframe is an uplink subframe, the UE determines that the flexible subframe is an uplink subframe, if the base station does not notify the UE of whether the flexible subframe is an uplink subframe or a downlink subframe, the UE determines that the flexible subframe is a downlink subframe. However, this embodiment of the present invention sets no limitation on a manner in which the base station specifically indicates whether the flexible subframe is currently an uplink subframe or a downlink subframe.

Optionally, the foregoing flexible subframe may be configured as an uplink subframe or a downlink subframe.

Therefore, when needing to send the foregoing uplink information, the UE may determine whether the flexible subframe is configured as an uplink subframe or a downlink subframe, and when the flexible subframe is configured as an uplink subframe, send the foregoing uplink information in the subframe. When the flexible subframe is configured as a downlink subframe, the UE may consider the flexible subframe invalid and not send the foregoing uplink information in the flexible subframe. However, this embodiment of the present invention is not limited thereto.

Optionally, the determining, according to the first subframe configuration indication information, whether to transmit uplink information in the flexible subframe in S120 includes the following steps.

S121. Determine, according to the first subframe configuration indication information, that the flexible subframe is an uplink subframe, and determine to transmit the uplink information in the flexible subframe.

Optionally, when the UE determines that the flexible subframe is an uplink subframe, the UE may send the uplink information to the base station in the flexible subframe, and accordingly, the method 100 further includes the following steps.

S130. Use the flexible subframe to carry the uplink information, and send the uplink information to the base station by using the flexible subframe.

Optionally, in another embodiment, the determining, according to the first subframe configuration indication information, whether to transmit uplink information in the flexible subframe in S120 includes the following.

S122. Determine, according to the first subframe configuration indication information, that the flexible subframe is a downlink subframe, and determine not to transmit the uplink information in the flexible subframe.

Optionally, when the UE determines that the flexible subframe is a downlink subframe, the UE may send the uplink information to the base station in a constant uplink subframe, and accordingly, the method 100 further includes the following.

S140. Use another uplink subframe except the flexible subframe in a TDD uplink-downlink subframe ratio indicated by the TDD uplink-downlink subframe ratio configuration to carry the uplink information.

S150. Send the uplink information to the base station by using the another uplink subframe.

Optionally, in another embodiment, the base station may periodically send the first subframe configuration indication information to the UE, where the first subframe configuration indication information indicates that the flexible subframe is configured as an uplink subframe or a downlink subframe. Correspondingly, the UE may periodically receive the first subframe configuration indication information at a same time interval. When the UE does not successfully receive the first subframe configuration indication information at a period time sent from the base station, the UE cannot determine whether the flexible subframe is configured as an uplink subframe or a downlink subframe. Optionally, before a next period time arrives, the UE may not transmit the uplink information in the flexible subframe. However, this embodiment of the present invention is not limited thereto. A time interval between the foregoing adjacent period times is a sending period for periodically sending the first subframe configuration indication information to the UE in the foregoing.

Accordingly, optionally, the method 100 further includes the following steps.

S160. When the first subframe configuration indication information periodically sent from the base station by using a first sending period as a time interval is not received at a first period time, determine not to transmit the uplink information in the flexible subframe before a second period time, where a time interval between the first period time and the second period time is the first sending period.

Optionally, in another embodiment, when the resource configuration indication information indicates uplink resources that are configured by the base station for the UE and used to send one or more types of uplink information, such as an SR, a CQI, an SRS, and a PRACH, the base station may notify the UE of the uplink resources by using dedicated signaling of the UE or broadcast signaling.

When the resource configuration indication information indicates an uplink resource that is configured by the base station for the UE and used to send a PRACH, the base station may also use broadcast signaling to carry the resource configuration indication information, and the resource configuration indication information may be in an extended PRACH resource configuration format, to be distinguished from an existing PRACH resource configuration. However, this embodiment of the present invention is not limited thereto. Accordingly, the receiving resource configuration indication information sent from a base station in Silo may include the following.

S111. Receive dedicated signaling sent from the base station, where the dedicated signaling carries the resource configuration indication information, or S112. Receive broadcast signaling sent from the base station, where the broadcast signaling carries the resource configuration indication information.

When receiving the resource configuration indication information, the UE may use a PRACH resource configured in the extended PRACH resource configuration format as an available PRACH resource, or may use a PRACH resource configured in the extended PRACH resource configuration format and a PRACH resource configured in an existing PRACH resource configuration format as a common available PRACH resource, which is not limited in this embodiment of the present invention.

Optionally, in another embodiment, if the UE sends the PRACH to the base station in the flexible subframe, that is, the UE sends a random access preamble to the base station on the PRACH, the base station may send a random access response (RAR) message to the UE in a constant subframe or in a flexible subframe whose subframe direction is configured to be downlink. Correspondingly, the UE may also detect the RAR message in the constant downlink subframe or in the flexible subframe whose subframe direction is configured to be downlink, where the constant downlink subframe and the flexible subframe are included in a receive window of the RAR message (RAR window). However, this embodiment of the present invention is not limited thereto.

Figure 2:
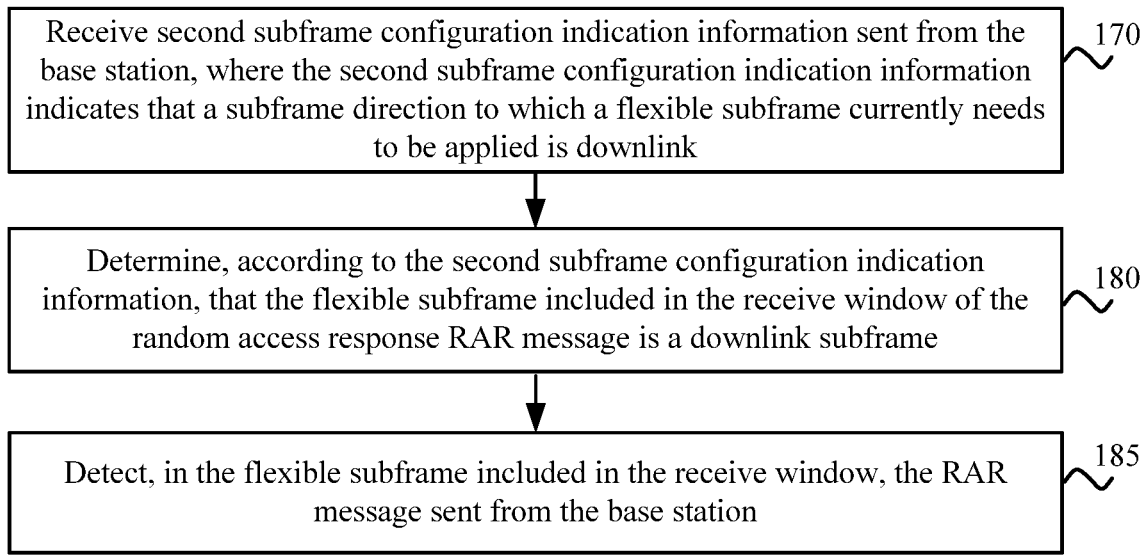
FIG. 2 is another schematic flowchart of the method for transmitting uplink information according to the embodiment of the present invention.

Accordingly, as shown in FIG. 2, the method 100 further includes the following steps.

S170. Receive second subframe configuration indication information sent from the base station, where the second subframe configuration indication information indicates that a subframe direction to which a flexible subframe currently needs to be applied is downlink, where the flexible subframe is included in a receive window of a random access response RAR message.

S180. Determine, according to the second subframe configuration indication information, that the flexible subframe included in the receive window of the random access response RAR message is a downlink subframe.

S185. Detect, in the flexible subframe included in the receive window, the RAR message sent from the base station.

When the base station configures one flexible subframe for the UE within a radio frame, the flexible subframe included in the receive window is the same as the flexible subframe used by the UE to send the PRACH, when the base station configures at least two flexible subframes for the UE within a radio frame, the flexible subframe included in the receive window may be the same as or different from the flexible subframe used by the UE to send the PRACH, which is not limited in this embodiment of the present invention.

Optionally, in another embodiment, the UE may also report capability information of the UE after gaining access to the base station, where the capability information may include a capability about whether the UE supports a flexible subframe. Accordingly, when learning from the capability information of the UE that the UE supports a flexible subframe, the base station may configure at least one flexible subframe for the UE. Accordingly, before S110, the method 100 further includes the following.

S190. Send capability information of the UE to the base station, where the capability information of the UE includes a capability about whether the UE supports a flexible subframe, and the capability information of the UE is used to instruct the base station to configure the flexible subframe for the UE according to the capability information of the UE.

Therefore, according to the method for transmitting uplink information in this embodiment of the present invention, an uplink resource configured by a base station for a UE that supports a flexible subframe ratio includes at least one flexible subframe, instead of excluding the flexible subframe, so that uplink resources available to the UE increase. Therefore, uplink resource use can be balanced, an uplink resource utilization rate can be improved, and system performance and user experience can be improved. In another aspect, according to the method for transmitting uplink information in this embodiment of the present invention, uplink subframes that are actually available to the UE increase, and the flexible subframe is used with another uplink subframe, so that an uplink resource can be flexibly configured for the UE that supports a flexible subframe, thereby increasing flexibility in sending an uplink CQI, an uplink SR, and an uplink SRS, and reducing a random access delay.

Figure 3:
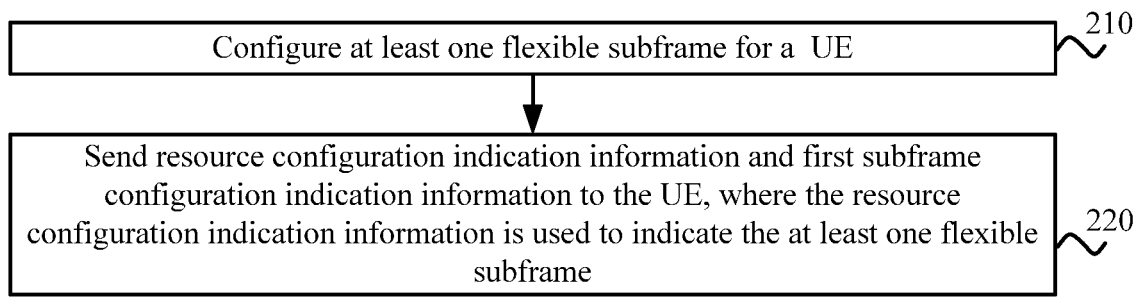
FIG. 3 is a schematic flowchart of a method for transmitting uplink information according to another embodiment of the present invention.

FIG. 3 is a schematic flowchart of a method 200 for transmitting uplink information according to another embodiment of the present invention. The method may be executed by any proper network-side device. For ease of description, an example in which the method is executed by a base station is used for description in the following. However, this embodiment of the present invention is not limited thereto. As shown in FIG. 3, the method 200 includes the following steps.

S210. Configure at least one flexible subframe for a user equipment UE, where the flexible subframe includes a subframe whose subframe direction can be changed when the base station configures at least one time division duplex TDD uplink-downlink subframe ratio configuration for the UE.

S220. Send resource configuration indication information and first subframe configuration indication information to the UE, where the resource configuration indication information is used to indicate the at least one flexible subframe, the first subframe configuration indication information is used to indicate a subframe direction to which the flexible subframe currently needs to be applied, and the first subframe configuration indication information is used to instruct the UE to transmit uplink information according to the first subframe configuration indication information.

Therefore, according to the method for transmitting uplink information in this embodiment of the present invention, an uplink resource configured by a base station for a UE that supports a flexible subframe ratio includes at least one flexible subframe, instead of excluding the flexible subframe, so that uplink resources available to the UE increase. Therefore, uplink resource use can be balanced, an uplink resource utilization rate can be improved, and system performance and user experience can be improved. In another aspect, according to the method for transmitting uplink information in this embodiment of the present invention, uplink subframes that are actually available to the UE increase, and the flexible subframe is used with another uplink subframe, so that an uplink resource can be flexibly configured for the UE that supports a flexible subframe, thereby increasing flexibility in sending an uplink CQI, an uplink SR, and an uplink SRS, and reducing a random access delay.

In this embodiment of the present invention, the base station may allocate, to the UE according to a capability of the UE, an uplink transmission resource used to transmit the uplink information. Optionally, the uplink information includes at least one of the following: a scheduling request (SR), a channel quality indicator (CQI), a sounding reference signal (SRS), and a physical random access channel (PRACH). However, this embodiment of the present invention is not limited thereto.

When the base station allocates an uplink transmission resource to a UE that does not have a capability of supporting a flexible subframe, the flexible subframe may be excluded from the uplink transmission resource. When the base station allocates an uplink transmission resource to a UE that has a capability of supporting a flexible subframe, at least one flexible subframe may be included in the uplink transmission resource, where the uplink transmission resource may be indicated by using resource configuration indication information. Accordingly, the base station may further send the first subframe configuration indication information to the UE, to indicate whether the subframe direction to which the flexible subframe currently needs to be applied is uplink or downlink, where the flexible subframe is configured for the UE, so that the UE determines, according to the first subframe configuration indication information, whether to send the uplink information in the flexible subframe.

Optionally, the base station may configure one TDD uplink-downlink subframe ratio configuration for the UE that supports a flexible subframe, and indicate a subframe that is in the TDD uplink-downlink subframe ratio configuration and is a flexible subframe, or the base station may configure at least two TDD uplink-downlink subframe ratio configurations for the UE, and configure different subframe directions for the flexible subframe in the at least two TDD uplink-downlink subframe ratio configurations, to indicate that the subframe is a flexible subframe. Accordingly, that the resource configuration indication information is used to indicate the at least one flexible subframe includes that the resource configuration indication information is used to indicate at least two TDD uplink-downlink subframe ratio configurations that are configured for the UE, where the at least two TDD uplink-downlink subframe ratio configurations include a first uplink-downlink subframe ratio configuration and a second uplink-downlink subframe ratio configuration, and when a first subframe is respectively configured as an uplink subframe and a downlink subframe in the first uplink-downlink subframe ratio configuration and the second uplink-downlink subframe ratio configuration, the first subframe is the flexible subframe.

Optionally, in another embodiment, that the first subframe configuration indication information is used to indicate a subframe direction to which the flexible subframe currently needs to be applied includes that the first subframe configuration indication information is used to indicate a TDD uplink-downlink subframe ratio configuration that currently needs to be used when the base station configures at least two TDD uplink-downlink subframe ratio configurations for the UE, where the TDD uplink-downlink subframe ratio configuration that currently needs to be used includes the subframe direction to which the flexible subframe currently needs to be applied.

Optionally, in another embodiment, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures one TDD uplink-downlink subframe ratio configuration for the UE.

Optionally, in another embodiment, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures at least two TDD uplink-downlink subframe ratio configurations for the UE, and the first subframe configuration indication information is further used to indicate a TDD uplink-downlink subframe ratio configuration that currently needs to be used.

Optionally, in another embodiment, the method 200 further includes the following steps.

S230. When the first subframe configuration indication information indicates that the subframe direction to which the flexible subframe currently needs to be applied is uplink, receive the uplink information sent from the UE in the flexible subframe.

Optionally, in another embodiment, the method 200 further includes the following steps.

S240. When the first subframe configuration indication information indicates that the subframe direction to which the flexible subframe currently needs to be applied is downlink, receive the uplink information sent from the UE in another uplink subframe except the flexible subframe in a TDD uplink-downlink subframe ratio indicated by the TDD uplink-downlink subframe ratio configuration.

Optionally, in another embodiment, the sending resource configuration indication information to the UE in S220 includes the following steps.

S221. Send dedicated signaling to the UE, where the dedicated signaling carries the resource configuration indication information, or S222. Send broadcast signaling to the UE, where the broadcast signaling carries the resource configuration indication information.

Figure 4:
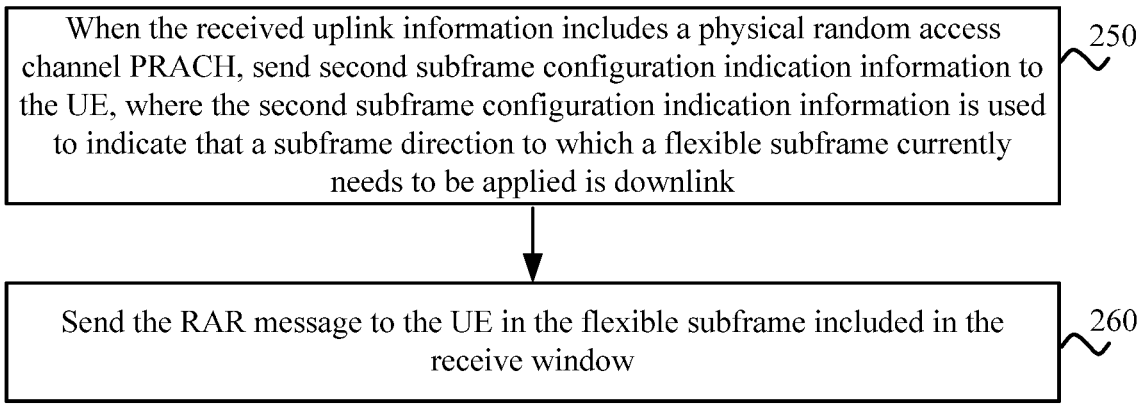
FIG. 4 is another schematic flowchart of the method for transmitting uplink information according to the another embodiment of the present invention.

Optionally, in another embodiment, when receiving a random access preamble sent from the UE on a PRACH, the base station may send a RAR message in a constant subframe or in a flexible subframe whose subframe direction is configured to be downlink, where the constant subframe and the flexible subframe are included in a transmit window of the RAR message (RAR window). Accordingly, as shown in FIG. 4, the method 200 further includes the following steps.

S250. When the received uplink information includes a physical random access channel PRACH, send second subframe configuration indication information to the UE, where the second subframe configuration indication information is used to indicate that a subframe direction to which a flexible subframe currently needs to be applied is downlink, where the flexible subframe is included in a receive window of a random access response RAR message, and the second subframe configuration indication information is used to instruct the UE to detect, according to the second subframe configuration indication information, the RAR message in the flexible subframe included in the receive window.

S260. Send the RAR message to the UE in the flexible subframe included in the receive window.

When the base station configures one flexible subframe for the UE within a radio frame, the flexible subframe included in the receive window is the same as a flexible subframe used by the UE to send the PRACH, when the base station configures at least two flexible subframes for the UE within a radio frame, the flexible subframe included in the receive window may be the same as or different from a flexible subframe used by the UE to send the PRACH, which is not limited in this embodiment of the present invention.

Figure 5:
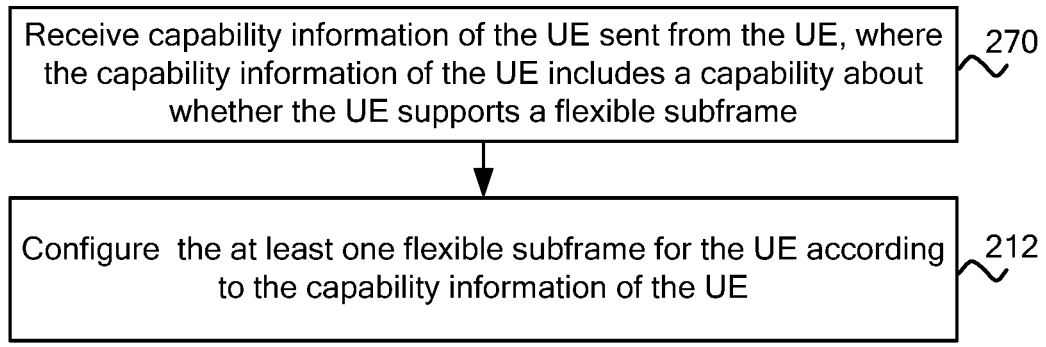
FIG. 5 is still another schematic flowchart of the method for transmitting uplink information according to the another embodiment of the present invention.

Optionally, in another embodiment, as shown in FIG. 5, before S210, the method 200 further includes the following step.

S270. Receive capability information of the UE sent from the UE, where the capability information of the UE includes a capability about whether the UE supports a flexible subframe.

Accordingly, the configuring at least one flexible subframe for a user equipment UE in S210 includes the following step.

S212. Configure the at least one flexible subframe for the UE according to the capability information of the UE.

Therefore, according to the method for transmitting uplink information in this embodiment of the present invention, an uplink resource configured by a base station for a UE that supports a flexible subframe ratio includes at least one flexible subframe, instead of excluding the flexible subframe, so that uplink resources available to the UE increase. Therefore, uplink resource use can be balanced, an uplink resource utilization rate can be improved, and system performance and user experience can be improved. In another aspect, according to the method for transmitting uplink information in this embodiment of the present invention, uplink subframes that are actually available to the UE increase, and the flexible subframe is used with another uplink subframe, so that an uplink resource can be flexibly configured for the UE that supports a flexible subframe, thereby increasing flexibility in sending an uplink CQI, an uplink SR, and an uplink SRS, and reducing a random access delay.

It should be understood that sequence numbers of the foregoing processes do not indicate an execution sequence. An execution sequence of each process shall be determined by a function and internal logic of the process, and shall not be construed as any limitation on an implementation process of this embodiment of the present invention.

With reference to FIG. 1 to FIG. 5, the foregoing describes in detail the methods for transmitting uplink information according to the embodiments of the present invention. With reference to FIG. 6 to FIG. 13, the following describes apparatuses for transmitting uplink information according to embodiments of the present invention.

Figure 6:
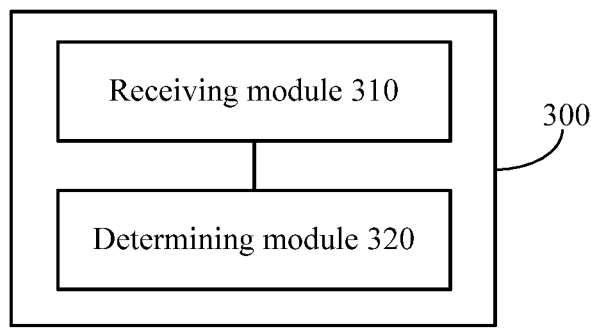
FIG. 6 is a schematic block diagram of an apparatus for transmitting uplink information according to an embodiment of the present invention.

FIG. 6 is a schematic block diagram of an apparatus 300 for transmitting uplink information according to an embodiment of the present invention. The apparatus 300 for transmitting uplink information may be a user equipment UE. However, this embodiment of the present invention is not limited thereto. As shown in FIG. 6, the apparatus 300 for transmitting uplink information includes a receiving module 310, configured to receive resource configuration indication information and first subframe configuration indication information that are sent from a base station, where the resource configuration indication information is used to indicate at least one flexible subframe, the flexible subframe includes a subframe whose subframe direction can be changed when the base station configures at least one time division duplex TDD uplink-downlink subframe ratio configuration for the user equipment UE, and the first subframe configuration indication information is used to indicate a subframe direction to which the flexible subframe currently needs to be applied, and a determining module 320, configured to determine, according to the first subframe configuration indication information received by the receiving module 310, whether to transmit uplink information in the flexible subframe indicated by the resource configuration indication information that is received by the receiving module 310.

Therefore, according to the apparatus for transmitting uplink information in this embodiment of the present invention, an uplink resource configured by a base station for a UE that supports a flexible subframe ratio includes at least one flexible subframe, instead of excluding the flexible subframe, so that uplink resources available to the UE increase. Therefore, uplink resource use can be balanced, an uplink resource utilization rate can be improved, and system performance and user experience can be improved. In another aspect, according to the apparatus for transmitting uplink information in this embodiment of the present invention, uplink subframes that are actually available to the UE increase, and the flexible subframe is used with another uplink subframe, so that an uplink resource can be flexibly configured for the UE that supports a flexible subframe, thereby increasing flexibility in sending an uplink CQI, an uplink SR, and an uplink SRS, and reducing a random access delay.

Optionally, that the resource configuration indication information is used to indicate at least one flexible subframe includes that the resource configuration indication information is used to indicate at least two TDD uplink-downlink subframe ratio configurations that are configured for the UE, where the at least two TDD uplink-downlink subframe ratio configurations include a first uplink-downlink subframe ratio configuration and a second uplink-downlink subframe ratio configuration, and when a first subframe is respectively configured as an uplink subframe and a downlink subframe in the first uplink-downlink subframe ratio configuration and the second uplink-downlink subframe ratio configuration, the first subframe is the flexible subframe.

Optionally, in another embodiment, that the first subframe configuration indication information is used to indicate a subframe direction to which the flexible subframe currently needs to be applied includes that the first subframe configuration indication information is used to indicate a TDD uplink-downlink subframe ratio configuration that currently needs to be used when the base station configures at least two TDD uplink-downlink subframe ratio configurations for the UE, where the TDD uplink-downlink subframe ratio configuration that currently needs to be used includes the subframe direction to which the flexible subframe currently needs to be applied.

Optionally, in another embodiment, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures one TDD uplink-downlink subframe ratio configuration for the UE.

Optionally, in another embodiment, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures at least two TDD uplink-downlink subframe ratio configurations for the UE, and the first subframe configuration indication information is further used to indicate a TDD uplink-downlink subframe ratio configuration that currently needs to be used.

Optionally, in another embodiment, the determining module 320 is specifically configured to determine, according to the first subframe configuration indication information received by the receiving module 310, that the flexible subframe is an uplink subframe, and determine to transmit the uplink information in the flexible subframe.

Figure 7:
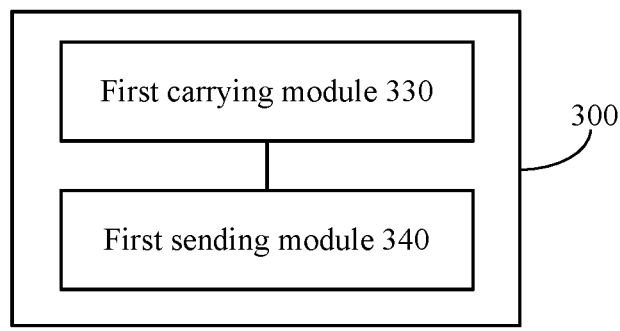
FIG. 7 is another schematic block diagram of the apparatus for transmitting uplink information according to the embodiment of the present invention.

Optionally, in another embodiment, as shown in FIG. 7, the apparatus 300 further includes a first carrying module 330, configured to use the flexible subframe to carry the uplink information, and a first sending module 340, configured to send, to the base station by using the flexible subframe, the uplink information carried by the first carrying module 330.

Optionally, in another embodiment, the determining module 320 is specifically configured to determine, according to the first subframe configuration indication information received by the receiving module 310, that the flexible subframe is a downlink subframe, and determine not to transmit the uplink information in the flexible subframe.

Figure 8:
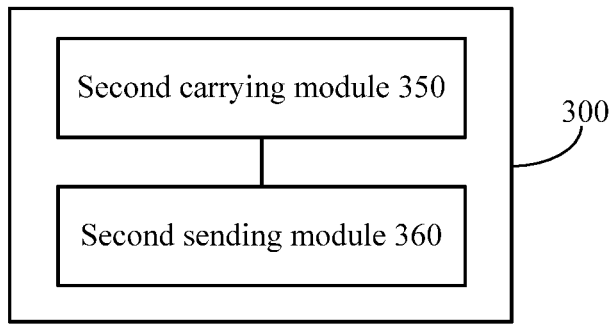
FIG. 8 is still another schematic block diagram of the apparatus for transmitting uplink information according to the embodiment of the present invention.

Optionally, in another embodiment, as shown in FIG. 8, the apparatus 300 further includes a second carrying module 350, configured to use another uplink subframe except the flexible subframe in a TDD uplink-downlink subframe ratio indicated by the TDD uplink-downlink subframe ratio configuration to carry the uplink information, and a second sending module 360, configured to send, to the base station by using the another uplink subframe, the uplink information carried by the second carrying module 350.

Optionally, in another embodiment, the uplink information includes at least one of the following: a scheduling request (SR), a channel quality indicator (CQI), a sounding reference signal (SRS), and a physical random access channel (PRACH).

Optionally, in another embodiment, the uplink information includes a physical random access channel PRACH.

The receiving module 310 is further configured to receive second subframe configuration indication information sent from the base station, where the second subframe configuration indication information indicates that a subframe direction to which a flexible subframe currently needs to be applied is downlink, where the flexible subframe is included in a receive window of a random access response RAR message.

The determining module 320 is further configured to determine, according to the second subframe configuration indication information received by the receiving module 310, that the flexible subframe included in the receive window of the random access response RAR message is a downlink subframe.

Figure 9:
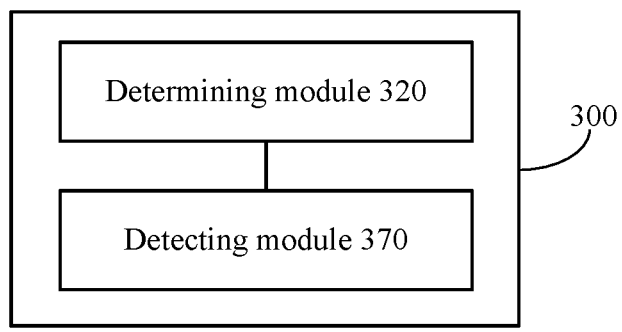
FIG. 9 is yet another schematic block diagram of the apparatus for transmitting uplink information according to the embodiment of the present invention.

Accordingly, as shown in FIG. 9, the apparatus 300 further includes a detecting module 370, configured to detect, in the flexible subframe that is included in the receive window and is determined by the determining module 320 as a downlink subframe, the RAR message sent from the base station.

Optionally, in another embodiment, the determining module 320 is further configured to when the receiving module 310 does not receive the first subframe configuration indication information at a first period time periodically sent from the base station by using a first sending period as a time interval, determine not to transmit the uplink information in the flexible subframe before a second period time, where a time interval between the first period time and the second period time is the first sending period.

Optionally, in another embodiment, the receiving module 310 is specifically configured to receive dedicated signaling sent from the base station, where the dedicated signaling carries the resource configuration indication information, or receive broadcast signaling sent from the base station, where the broadcast signaling carries the resource configuration indication information.

Optionally, in another embodiment, the apparatus 300 further includes a third sending module 380, configured to before the receiving module 310 receives the resource configuration indication information sent from the base station, send capability information of the UE to the base station, where the capability information of the UE includes a capability about whether the UE supports a flexible subframe, and the capability information of the UE is used to instruct the base station to configure the flexible subframe for the UE according to the capability information of the UE.

The apparatus 300 for transmitting uplink information according to this embodiment of the present invention may correspond to the user equipment in the method for transmitting uplink information according to the embodiment of the present invention, and the foregoing and other operations and/or functions of modules in the apparatus 300 for transmitting uplink information are used to implement corresponding procedures of the method in FIG. 1 and FIG. 2. For brevity, details are not described herein again.

Therefore, according to the apparatus for transmitting uplink information in this embodiment of the present invention, an uplink resource configured by a base station for a UE that supports a flexible subframe ratio includes at least one flexible subframe, instead of excluding the flexible subframe, so that uplink resources available to the UE increase. Therefore, uplink resource use can be balanced, an uplink resource utilization rate can be improved, and system performance and user experience can be improved. In another aspect, according to the method for transmitting uplink information in this embodiment of the present invention, uplink subframes that are actually available to the UE increase, and the flexible subframe is used with another uplink subframe, so that an uplink resource can be flexibly configured for the UE that supports a flexible subframe, thereby increasing flexibility in sending an uplink CQI, an uplink SR, and an uplink SRS, and reducing a random access delay.

Figure 10:
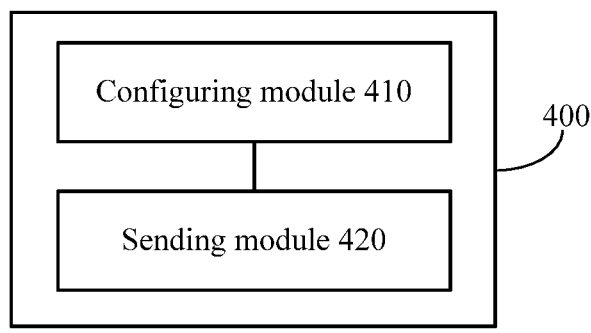
FIG. 10 is a schematic block diagram of an apparatus for transmitting uplink information according to another embodiment of the present invention.

FIG. 10 is a schematic block diagram of an apparatus 400 for transmitting uplink information according to another embodiment of the present invention. The apparatus 400 for transmitting uplink information may be a base station.

However, this embodiment of the present invention is not limited thereto. As shown in FIG. 10, the apparatus 400 for transmitting uplink information includes a configuring module 410, configured to configure at least one flexible subframe for a user equipment UE, where the flexible subframe includes a subframe whose subframe direction can be changed when the base station configures at least one time division duplex TDD uplink-downlink subframe ratio configuration for the UE, and a sending module 420, configured to send resource configuration indication information and first subframe configuration indication information to the UE, where the resource configuration indication information is used to indicate the at least one flexible subframe configured by the configuring module 410, the first subframe configuration indication information is used to indicate a subframe direction to which the flexible subframe currently needs to be applied, and the first subframe configuration indication information is used to instruct the UE to transmit uplink information according to the first subframe configuration indication information.

Therefore, according to the apparatus for transmitting uplink information in this embodiment of the present invention, an uplink resource configured by a base station for a UE that supports a flexible subframe ratio includes at least one flexible subframe, instead of excluding the flexible subframe, so that uplink resources available to the UE increase. Therefore, uplink resource use can be balanced, an uplink resource utilization rate can be improved, and system performance and user experience can be improved. In another aspect, according to the method for transmitting uplink information in this embodiment of the present invention, uplink subframes that are actually available to the UE increase, and the flexible subframe is used with another uplink subframe, so that an uplink resource can be flexibly configured for the UE that supports a flexible subframe, thereby increasing flexibility in sending an uplink CQI, an uplink SR, and an uplink SRS, and reducing a random access delay.

Optionally, that the resource configuration indication information is used to indicate the at least one flexible subframe includes that the resource configuration indication information is used to indicate at least two TDD uplink-downlink subframe ratio configurations that are configured for the UE, where the at least two TDD uplink-downlink subframe ratio configurations include a first uplink-downlink subframe ratio configuration and a second uplink-downlink subframe ratio configuration, and when a first subframe is respectively configured as an uplink subframe and a downlink subframe in the first uplink-downlink subframe ratio configuration and the second uplink-downlink subframe ratio configuration, the first subframe is the flexible subframe.

Optionally, in another embodiment, that the first subframe configuration indication information is used to indicate a subframe direction to which the flexible subframe currently needs to be applied includes that the first subframe configuration indication information is used to indicate a TDD uplink-downlink subframe ratio configuration that currently needs to be used when the base station configures at least two TDD uplink-downlink subframe ratio configurations for the UE, where the TDD uplink-downlink subframe ratio configuration that currently needs to be used includes the subframe direction to which the flexible subframe currently needs to be applied.

Optionally, in another embodiment, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures one TDD uplink-downlink subframe ratio configuration for the UE.

Optionally, in another embodiment, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures at least two TDD uplink-downlink subframe ratio configurations for the UE, and the first subframe configuration indication information is further used to indicate a TDD uplink-downlink subframe ratio configuration that currently needs to be used.

Optionally, in another embodiment, the apparatus 400 further includes a first receiving module 430, configured to when the first subframe configuration indication information sent from the sending module 420 indicates that the subframe direction to which the flexible subframe currently needs to be applied is uplink, receive the uplink information sent from the UE in the flexible subframe.

Optionally, in another embodiment, the apparatus 400 further includes a second receiving module 440, configured to when the first subframe configuration indication information sent from the sending module 420 indicates that the subframe direction to which the flexible subframe currently needs to be applied is downlink, receive the uplink information sent from the UE in another uplink subframe except the flexible subframe in a TDD uplink-downlink subframe ratio indicated by the TDD uplink-downlink subframe ratio configuration.

Optionally, in another embodiment, the uplink information includes at least one of the following: a scheduling request (SR), a channel quality indicator (CQI), a sounding reference signal (SRS), and a physical random access channel (PRACH).

Optionally, in another embodiment, the sending module 420 is further configured to when the uplink information received by the first receiving module 430 includes a physical random access channel PRACH, send second subframe configuration indication information to the UE, where the second subframe configuration indication information is used to indicate that a subframe direction to which a flexible subframe currently needs to be applied is downlink, where the flexible subframe is included in a receive window of a random access response RAR message, and the second subframe configuration indication information is used to instruct the UE to detect, according to the second subframe configuration indication information, the RAR message in the flexible subframe included in the receive window, and the sending module 420 is further configured to send the RAR message to the UE in the flexible subframe included in the receive window.

Optionally, in another embodiment, the sending module 420 is specifically configured to send dedicated signaling to the UE, where the dedicated signaling carries the resource configuration indication information, or send broadcast signaling to the UE, where the broadcast signaling carries the resource configuration indication information.

Figure 11:
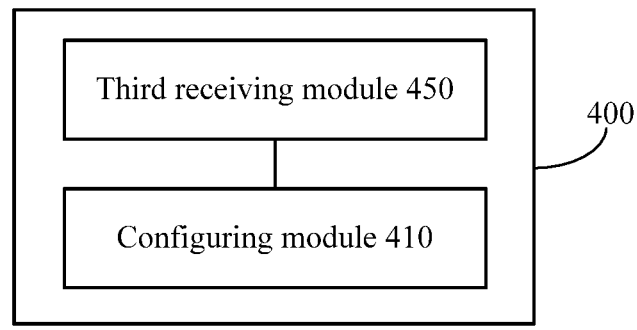
FIG. 11 is another schematic block diagram of the apparatus for transmitting uplink information according to the another embodiment of the present invention.

Optionally, in another embodiment, as shown in FIG. 11, the apparatus 400 further includes a third receiving module 450, configured to before the configuring module 410 configures the at least one flexible subframe for the UE, receive capability information of the UE sent from the UE, where the capability information of the UE includes a capability about whether the UE supports a flexible subframe.

Accordingly, the configuring module 410 is specifically configured to configure the at least one flexible subframe for the UE according to the capability information of the UE received by the third receiving module 450.

The apparatus 400 for transmitting uplink information according to this embodiment of the present invention may correspond to the base station in the method for transmitting uplink information according to the embodiment of the present invention, and the foregoing and other operations and/or functions of modules in the apparatus 400 for transmitting uplink information are used to implement corresponding procedures of the method in FIG. 3 to FIG. 5. For brevity, details are not described herein again.

Therefore, according to the apparatus for transmitting uplink information in this embodiment of the present invention, an uplink resource configured by a base station for a UE that supports a flexible subframe ratio includes at least one flexible subframe, instead of excluding the flexible subframe, so that uplink resources available to the UE increase. Therefore, uplink resource use can be balanced, an uplink resource utilization rate can be improved, and system performance and user experience can be improved. In another aspect, according to the method for transmitting uplink information in this embodiment of the present invention, uplink subframes that are actually available to the UE increase, and the flexible subframe is used with another uplink subframe, so that an uplink resource can be flexibly configured for the UE that supports a flexible subframe, thereby increasing flexibility in sending an uplink CQI, an uplink SR, and an uplink SRS, and reducing a random access delay.

Figure 12:
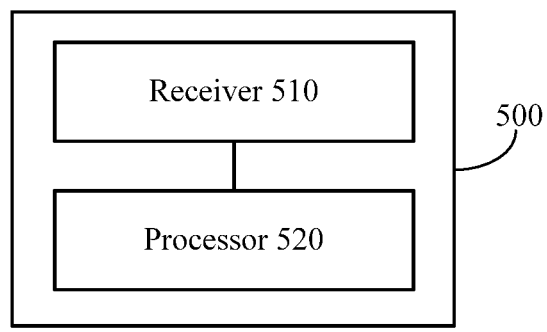
FIG. 12 is a schematic block diagram of an apparatus for transmitting uplink information according to still another embodiment of the present invention.

FIG. 12 is a schematic block diagram of an apparatus 500 for transmitting uplink information according to still another embodiment of the present invention. The apparatus 500 for transmitting uplink information may be a user equipment UE. However, this embodiment of the present invention is not limited thereto. As shown in FIG. 12, the apparatus 500 for transmitting uplink information includes a receiver 510 and a processor 520. The receiver 510 is configured to receive resource configuration indication information and first subframe configuration indication information that are sent from a base station, where the resource configuration indication information is used to indicate at least one flexible subframe, the flexible subframe includes a subframe whose subframe direction can be changed when the base station configures at least one time division duplex TDD uplink-downlink subframe ratio configuration for the user equipment UE, and the first subframe configuration indication information is used to indicate a subframe direction to which the flexible subframe currently needs to be applied. The processor 520 is configured to determine, according to the first subframe configuration indication information received by the receiver 510, whether to transmit uplink information in the flexible subframe indicated by the resource configuration indication information that is received by the receiver 510.

Therefore, according to the apparatus for transmitting uplink information in this embodiment of the present invention, an uplink resource configured by a base station for a UE that supports a flexible subframe ratio includes at least one flexible subframe, instead of excluding the flexible subframe, so that uplink resources available to the UE increase. Therefore, uplink resource use can be balanced, an uplink resource utilization rate can be improved, and system performance and user experience can be improved. In another aspect, according to the method for transmitting uplink information in this embodiment of the present invention, uplink subframes that are actually available to the UE increase, and the flexible subframe is used with another uplink subframe, so that an uplink resource can be flexibly configured for the UE that supports a flexible subframe, thereby increasing flexibility in sending an uplink CQI, an uplink SR, and an uplink SRS, and reducing a random access delay.

It should be understood that in this embodiment of the present invention, the processor 520 may be a central processing unit (CPU), or the processor 520 may be another general purpose processor, a digital signal processor (DSP), an application-specific integrated circuit (ASIC), a field programmable gate array (FPGA), another programmable logic device, a discrete gate or transistor logic device, a discrete hardware component, or the like. A general purpose processor may be a microprocessor or the processor may be any conventional processor, or the like.

During an implementation process, the steps in the foregoing methods may be completed by using an integrated logic circuit of hardware in the processor 520 or an instruction in a form of software. Steps of the methods disclosed with reference to the embodiments of the present invention may be directly executed and implemented by a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor 520 reads information in the memory and implements the steps in the foregoing methods in combination with hardware of the processor. To avoid repetition, details are not described herein again.

Optionally, that the resource configuration indication information is used to indicate at least one flexible subframe includes that the resource configuration indication information is used to indicate at least two TDD uplink-downlink subframe ratio configurations that are configured for the UE, where the at least two TDD uplink-downlink subframe ratio configurations include a first uplink-downlink subframe ratio configuration and a second uplink-downlink subframe ratio configuration, and when a first subframe is respectively configured as an uplink subframe and a downlink subframe in the first uplink-downlink subframe ratio configuration and the second uplink-downlink subframe ratio configuration, the first subframe is the flexible subframe.

Optionally, in another embodiment, that the first subframe configuration indication information is used to indicate a subframe direction to which the flexible subframe currently needs to be applied includes that the first subframe configuration indication information is used to indicate a TDD uplink-downlink subframe ratio configuration that currently needs to be used when the base station configures at least two TDD uplink-downlink subframe ratio configurations for the UE, where the TDD uplink-downlink subframe ratio configuration that currently needs to be used includes the subframe direction to which the flexible subframe currently needs to be applied.

Optionally, in another embodiment, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures one TDD uplink-downlink subframe ratio configuration for the UE.

Optionally, in another embodiment, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures at least two TDD uplink-downlink subframe ratio configurations for the UE, and the first subframe configuration indication information is further used to indicate a TDD uplink-downlink subframe ratio configuration that currently needs to be used.

Optionally, in another embodiment, the processor 520 is specifically configured to determine, according to the first subframe configuration indication information received by the receiver 510, that the flexible subframe is an uplink subframe, and determine to transmit the uplink information in the flexible subframe.

Optionally, in another embodiment, the processor 520 is further configured to use the flexible subframe to carry the uplink information.

Accordingly, the apparatus 500 further includes a transmitter 530, configured to send, to the base station by using the flexible subframe, the uplink information carried by the processor 520.

Optionally, in another embodiment, the processor 520 is specifically configured to determine, according to the first subframe configuration indication information received by the receiver 510, that the flexible subframe is a downlink subframe, and determine not to transmit the uplink information in the flexible subframe.

Optionally, in another embodiment, the processor 520 is further configured to use another uplink subframe except the flexible subframe in a TDD uplink-downlink subframe ratio indicated by the TDD uplink-downlink subframe ratio configuration to carry the uplink information.

Accordingly, the apparatus 500 further includes a transmitter 530, configured to send, to the base station by using the another uplink subframe, the uplink information carried by the processor 520.

Optionally, in another embodiment, the uplink information includes at least one of the following: a scheduling request (SR), a channel quality indicator (CQI), a sounding reference signal (SRS), and a physical random access channel (PRACH).

Optionally, in another embodiment, the uplink information includes a physical random access channel PRACH.

The receiver 510 is further configured to receive second subframe configuration indication information sent from the base station, where the second subframe configuration indication information indicates that a subframe direction to which a flexible subframe currently needs to be applied is downlink, where the flexible subframe is included in a receive window of a random access response RAR message.

The processor 520 is further configured to determine, according to the second subframe configuration indication information received by the receiver 510, that the flexible subframe included in the receive window of the random access response RAR message is a downlink subframe, and detect, in the flexible subframe that is included in the receive window and is determined as a downlink subframe, the RAR message sent from the base station.

Optionally, in another embodiment, the processor 520 is further configured to when the receiver 510 does not receive the first subframe configuration indication information at a first period time periodically sent from the base station by using a first sending period as a time interval, determine not to transmit the uplink information in the flexible subframe before a second period time, where a time interval between the first period time and the second period time is the first sending period.

Optionally, in another embodiment, the receiver 510 is specifically configured to receive dedicated signaling sent from the base station, where the dedicated signaling carries the resource configuration indication information, or receive broadcast signaling sent from the base station, where the broadcast signaling carries the resource configuration indication information.

Optionally, in another embodiment, the apparatus 500 further includes a transmitter 530, configured to before the receiver 510 receives the resource configuration indication information sent from the base station, send capability information of the UE to the base station, where the capability information of the UE includes a capability about whether the UE supports a flexible subframe, and the capability information of the UE is used to instruct the base station to configure the flexible subframe for the UE according to the capability information of the UE.

The apparatus 500 for transmitting uplink information according to this embodiment of the present invention may correspond to the user equipment in the method for transmitting uplink information according to the embodiment of the present invention, and the foregoing and other operations and/or functions of modules in the apparatus 500 for transmitting uplink information are used to implement corresponding procedures of the method in FIG. 1 to FIG. 2. For brevity, details are not described herein again.

Therefore, according to the apparatus for transmitting uplink information in this embodiment of the present invention, an uplink resource configured by a base station for a UE that supports a flexible subframe ratio includes at least one flexible subframe, instead of excluding the flexible subframe, so that uplink resources available to the UE increase. Therefore, uplink resource use can be balanced, an uplink resource utilization rate can be improved, and system performance and user experience can be improved. In another aspect, according to the method for transmitting uplink information in this embodiment of the present invention, uplink subframes that are actually available to the UE increase, and the flexible subframe is used with another uplink subframe, so that an uplink resource can be flexibly configured for the UE that supports a flexible subframe, thereby increasing flexibility in sending an uplink CQI, an uplink SR, and an uplink SRS, and reducing a random access delay.

Figure 13:
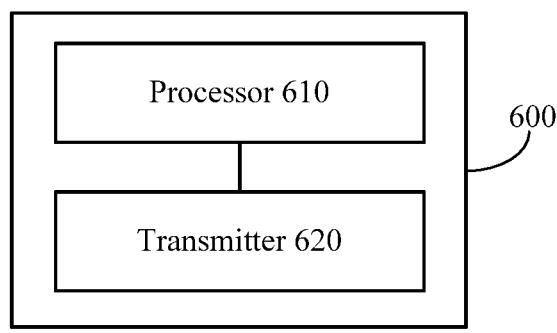
FIG. 13 is a schematic block diagram of an apparatus for transmitting uplink information according to yet another embodiment of the present invention.

FIG. 13 is a schematic block diagram of an apparatus 600 for transmitting uplink information according to yet another embodiment of the present invention. The apparatus 600 for transmitting uplink information may be a base station. However, this embodiment of the present invention is not limited thereto. As shown in FIG. 13, the apparatus 600 includes a processor 610 and a transmitter 620. The processor 610 is configured to configure at least one flexible subframe for a user equipment UE, where the flexible subframe includes a subframe whose subframe direction can be changed when the base station configures at least one time division duplex TDD uplink-downlink subframe ratio configuration for the UE. The transmitter 620 is configured to send resource configuration indication information and first subframe configuration indication information to the UE, where the resource configuration indication information is used to indicate the at least one flexible subframe configured by the processor 610, the first subframe configuration indication information is used to indicate a subframe direction to which the flexible subframe currently needs to be applied, and the first subframe configuration indication information is used to instruct the UE to transmit uplink information according to the first subframe configuration indication information.

Therefore, according to the apparatus for transmitting uplink information in this embodiment of the present invention, an uplink resource configured by a base station for a UE that supports a flexible subframe ratio includes at least one flexible subframe, instead of excluding the flexible subframe, so that uplink resources available to the UE increase. Therefore, uplink resource use can be balanced, an uplink resource utilization rate can be improved, and system performance and user experience can be improved. In another aspect, according to the method for transmitting uplink information in this embodiment of the present invention, uplink subframes that are actually available to the UE increase, and the flexible subframe is used with another uplink subframe, so that an uplink resource can be flexibly configured for the UE that supports a flexible subframe, thereby increasing flexibility in sending an uplink CQI, an uplink SR, and an uplink SRS, and reducing a random access delay.

It should be understood that in this embodiment of the present invention, the processor 610 may be a central processing unit (CPU), or the processor 610 may be another general purpose processor, a digital signal processor (DSP), an application-specific integrated circuit (ASIC), a field programmable gate array (FPGA), another programmable logic device, a discrete gate or transistor logic device, a discrete hardware component, or the like. A general purpose processor may be a microprocessor or the processor may be any conventional processor, or the like.

During an implementation process, the steps in the foregoing methods may be completed by using an integrated logic circuit of hardware in the processor 610 or an instruction in a form of software. Steps of the methods disclosed with reference to the embodiments of the present invention may be directly executed and implemented by a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor 610 reads information in the memory and implements the steps in the foregoing methods in combination with hardware of the processor. To avoid repetition, details are not described herein again.

Optionally, the processor 610 is specifically configured to configure at least two TDD uplink-downlink subframe ratio configurations for the UE, where the at least two TDD uplink-downlink subframe ratio configurations include a first uplink-downlink subframe ratio configuration and a second uplink-downlink subframe ratio configuration, and when a first subframe is respectively configured as an uplink subframe and a downlink subframe in the first uplink-downlink subframe ratio configuration and the second uplink-downlink subframe ratio configuration, the first subframe is the flexible subframe.

Optionally, in another embodiment, that the resource configuration indication information is used to indicate the at least one flexible subframe includes that the resource configuration indication information is used to indicate at least two TDD uplink-downlink subframe ratio configurations that are configured for the UE, where the at least two TDD uplink-downlink subframe ratio configurations include a first uplink-downlink subframe ratio configuration and a second uplink-downlink subframe ratio configuration, and when a first subframe is respectively configured as an uplink subframe and a downlink subframe in the first uplink-downlink subframe ratio configuration and the second uplink-downlink subframe ratio configuration, the first subframe is the flexible subframe.

Optionally, in another embodiment, that the first subframe configuration indication information is used to indicate a subframe direction to which the flexible subframe currently needs to be applied includes that the first subframe configuration indication information is used to indicate a TDD uplink-downlink subframe ratio configuration that currently needs to be used when the base station configures at least two TDD uplink-downlink subframe ratio configurations for the UE, where the TDD uplink-downlink subframe ratio configuration that currently needs to be used includes the subframe direction to which the flexible subframe currently needs to be applied.

Optionally, in another embodiment, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures one TDD uplink-downlink subframe ratio configuration for the UE.

Optionally, in another embodiment, that the first subframe configuration indication information is used to indicate a subframe direction to which the flexible subframe currently needs to be applied includes that the first subframe configuration indication information is used to indicate a subframe direction to which the flexible subframe currently needs to be applied when the base station configures at least two TDD uplink-downlink subframe ratio configurations for the UE, and the first subframe configuration indication information is further used to indicate a TDD uplink-downlink subframe ratio configuration that currently needs to be used.

Optionally, in another embodiment, the apparatus 600 further includes a receiver 630, configured to when the first subframe configuration indication information sent from the transmitter 620 indicates that the subframe direction to which the flexible subframe currently needs to be applied is uplink, receive the uplink information sent from the UE in the flexible subframe.

Optionally, in another embodiment, the apparatus 600 further includes a receiver 630, configured to when the first subframe configuration indication information sent from the transmitter 620 indicates that the subframe direction to which the flexible subframe currently needs to be applied is downlink, receive the uplink information sent from the UE in another uplink subframe except the flexible subframe in a TDD uplink-downlink subframe ratio indicated by the TDD uplink-downlink subframe ratio configuration.

Optionally, in another embodiment, the uplink information includes at least one of the following: a scheduling request (SR), a channel quality indicator (CQI), a sounding reference signal (SRS), and a physical random access channel (PRACH).

Optionally, in another embodiment, the transmitter 620 is further configured to when the uplink information received by the receiver 630 includes a physical random access channel PRACH, send second subframe configuration indication information to the UE, where the second subframe configuration indication information is used to indicate that a subframe direction to which a flexible subframe currently needs to be applied is downlink, where the flexible subframe is included in a receive window of a random access response RAR message, and the second subframe configuration indication information is used to instruct the UE to detect, according to the second subframe configuration indication information, the RAR message in the flexible subframe included in the receive window, the transmitter 620 is further configured to send the RAR message to the UE in the flexible subframe included in the receive window.

Optionally, in another embodiment, the transmitter 620 is specifically configured to send dedicated signaling to the UE, where the dedicated signaling carries the resource configuration indication information, or send broadcast signaling to the UE, where the broadcast signaling carries the resource configuration indication information.

Optionally, in another embodiment, the apparatus 600 further includes a receiver 630, configured to before the processor 610 configures the at least one flexible subframe for the UE, receive capability information of the UE sent from the UE, where the capability information of the UE includes a capability about whether the UE supports a flexible subframe.

Accordingly, the processor 610 is specifically configured to configure the at least one flexible subframe for the UE according to the capability information of the UE received by the receiver 630.

The apparatus 600 for transmitting uplink information according to this embodiment of the present invention may correspond to the base station in the method for transmitting uplink information according to the embodiment of the present invention, and the foregoing and other operations and/or functions of modules in the apparatus 600 for transmitting uplink information are used to implement corresponding procedures of the method in FIG. 3 to FIG. 5. For brevity, details are not described herein again.

Therefore, according to the apparatus for transmitting uplink information in this embodiment of the present invention, an uplink resource configured by a base station for a UE that supports a flexible subframe ratio includes at least one flexible subframe, instead of excluding the flexible subframe, so that uplink resources available to the UE increase. Therefore, uplink resource use can be balanced, an uplink resource utilization rate can be improved, and system performance and user experience can be improved. In another aspect, according to the method for transmitting uplink information in this embodiment of the present invention, uplink subframes that are actually available to the UE increase, and the flexible subframe is used with another uplink subframe, so that an uplink resource can be flexibly configured for the UE that supports a flexible subframe, thereby increasing flexibility in sending an uplink CQI, an uplink SR, and an uplink SRS, and reducing a random access delay.

It should be understood that, the term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes any medium that can store program code, such as a USB flash drive, a removable hard disk, a read-only memory (Read-Only Memory, "ROM), a random access memory (Random Access Memory, "RAM), a magnetic disk, or an optical disc.

The foregoing descriptions are merely specific implementation manners of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting uplink information, comprising:
   configuring, by a base station, a flexible subframe for a user equipment (UE), wherein the flexible subframe is a subframe in which the base station is configured to receive or transmit data according to a time division duplex (TDD) uplink-downlink subframe configuration of the subframe;
   sending, by the base station, resource configuration indication information and subframe configuration indication information to the UE, wherein the resource configuration indication information indicates the flexible subframe, wherein the subframe configuration indication information indicates a subframe direction to which the flexible subframe currently needs to be applied, wherein the subframe direction is a direction of transmission with respect to the base station, and wherein the subframe configuration indication information instructs the UE to transmit uplink information according to the subframe configuration indication information, and
   receiving, in response to the subframe configuration indication information indicating that the subframe direction to which the flexible subframe currently needs to be applied is downlink, the uplink information sent from the UE in another uplink subframe other than the flexible subframe in a TDD uplink-downlink subframe ratio indicated by the TDD uplink-downlink subframe configuration.

2. The method according to claim 1, wherein the subframe configuration indication information indicates the subframe direction to which the flexible subframe currently needs to be applied when the base station configures at least two TDD uplink-downlink subframe configurations for the UE; and
   wherein the subframe configuration indication information further indicates a TDD uplink-downlink subframe configuration that currently needs to be used.

3. The method according to claim 2, wherein the at least two TDD uplink-downlink subframe configurations comprise a first uplink-downlink subframe configuration and a second uplink-downlink subframe configuration; and
   wherein the flexible subframe corresponds to a subframe which is configured as an uplink subframe in the first uplink-downlink subframe configuration and is configured as a downlink subframe in the second uplink-downlink subframe configuration.

4. The method according to claim 1, wherein the uplink information comprises a sounding reference signal (SRS).

5. The method according to claim 1, wherein the sending the resource configuration indication information to the UE comprises performing at least one of:
   sending, by the base station, dedicated signaling to the UE, wherein the dedicated signaling carries the resource configuration indication information; or
   sending, by the base station, broadcast signaling to the UE, wherein the broadcast signaling carries the resource configuration indication information.

6. The method according to claim 1, wherein the method further comprises:
   receiving, by the base station, before the configuring the flexible subframe for the user equipment UE, capability information of the UE from the UE, wherein the capability information of the UE comprises an indication of a capability of the UE supporting a flexible subframe; and wherein the configuring the flexible subframe for the user equipment UE comprises:

configuring, by the base station, the flexible subframe for the UE according to the capability information of the UE.

7. A base station, comprising:
a transmitter;
a receiver;
a processor; and
a non-transitory computer-readable storage medium storing a program to be executed by the processor, the program including instructions for:
configure a flexible subframe for a user equipment (UE), a flexible subframe for a user equipment (UE), wherein the flexible subframe is a subframe in which the base station is configured to receive or transmit data according to a time division duplex (TDD) uplink-downlink subframe configuration of the subframe;
cause the transmitter to send resource configuration indication information and subframe configuration indication information to the UE, wherein the resource configuration indication information indicates the flexible subframe, wherein the subframe configuration indication information indicates a subframe direction to which the flexible subframe currently needs to be applied, wherein the subframe direction is a direction of transmission with respect to the base station, and wherein the subframe configuration indication information instructs the UE to transmit uplink information according to the subframe configuration indication information; and
receive, through the receiver, in response to the subframe configuration indication information indicating that the subframe direction to which the flexible subframe currently needs to be applied is downlink, the uplink information sent from the UE in another uplink subframe other than the flexible subframe in a TDD uplink-downlink subframe ratio indicated by the TDD uplink-downlink subframe configuration.

8. The base station according to claim 7, wherein the subframe configuration indication information indicates a subframe direction to which the flexible subframe currently needs to be applied when the base station configures at least two TDD uplink-downlink subframe configurations for the UE; and
wherein the subframe configuration indication information further indicates a TDD uplink-downlink subframe configuration that currently needs to be used.

9. The base station according to claim 8, wherein the at least two TDD uplink-downlink subframe configurations comprise a first uplink-downlink subframe configuration and a second uplink-downlink subframe configuration; and
wherein the flexible subframe corresponds to a subframe which is configured as an uplink subframe in the first uplink-downlink subframe configuration and is configured as a downlink subframe in the second uplink-downlink subframe configuration.

10. The base station according to claim 7, wherein the uplink information comprises a sounding reference signal (SRS).

11. The base station according to claim 7, wherein the program further includes instructions to perform at least one of:
cause the transmitter to send dedicated signaling to the UE, wherein the dedicated signaling carries the resource configuration indication information; or
cause the transmitter to send broadcast signaling to the UE, wherein the broadcast signaling carries the resource configuration indication information.

12. The base station according to claim 7, further comprising a receiver, wherein the program further includes instructions to
receive, through the receiver, capability information of the UE from the UE, wherein the capability information of the UE comprises an indication of a capability of the UE supporting a flexible subframe; and
configure the flexible subframe for the UE according to the capability information of the UE.

13. A method for transmitting uplink information, comprising:
configuring, by a base station, a flexible subframe for a user equipment (UE), wherein the flexible subframe is a subframe in which the base station is configured to receive or transmit data according to a time division duplex (TDD) uplink-downlink subframe configuration of the subframe;
sending, by the base station, resource configuration indication information and subframe configuration indication information to the UE, wherein the resource configuration indication information indicates the flexible subframe, wherein the subframe configuration indication information indicates a subframe direction to which the flexible subframe currently needs to be applied, wherein the subframe direction is a direction of transmission with respect to the base station, and wherein the subframe configuration indication information instructs the UE to transmit uplink information according to the subframe configuration indication information;
receiving, by the user equipment, the resource configuration indication information and the subframe configuration indication information from the base station;
determining, by the user equipment, the flexible subframe according to the resource configuration indication information;
determining, by the user equipment, to transmit uplink information in the flexible subframe according to the subframe configuration indication information; and
receiving, by the base station, in response to the subframe configuration indication information indicating that the subframe direction to which the flexible subframe currently needs to be applied is downlink, the uplink information sent from the UE in another uplink subframe other than the flexible subframe in a TDD uplink-downlink subframe ratio indicated by the TDD uplink-downlink subframe configuration.

14. The method according to claim 13, wherein the subframe configuration indication information indicates the subframe direction to which the flexible subframe currently needs to be applied when the base station configures at least two TDD uplink-downlink subframe configurations for the UE; and
wherein the subframe configuration indication information further indicates a TDD uplink-downlink subframe configuration that currently needs to be used.

15. The method according to claim 14, wherein the at least two TDD uplink-downlink subframe configurations comprise a first uplink-downlink subframe configuration and a second uplink-downlink subframe configuration; and wherein the flexible subframe corresponds to a subframe which is configured as an uplink subframe in the first uplink-downlink subframe configuration and is configured as a downlink subframe in the second uplink-downlink subframe configuration.

16. A system, comprising:

a user equipment (UE); and a base station;

wherein the base station is configured to:

configure a flexible subframe for the UE, wherein the flexible subframe is a subframe in which the base station is configured to receive or transmit data according to a time division duplex (TDD) uplink-downlink subframe configuration of the subframe; and send resource configuration indication information and subframe configuration indication information to the UE, wherein the resource configuration indication information indicates the flexible subframe, wherein the subframe configuration indication information indicates a subframe direction to which the flexible subframe currently needs to be applied, wherein the subframe direction is a direction of transmission with respect to the base station, and wherein the subframe configuration indication information instructs the UE to transmit uplink information according to the subframe configuration indication information;

wherein the UE is configured to:

receive resource configuration indication information and subframe configuration indication information from the base station;

determine the flexible subframe according to the resource configuration indication information; and determine to transmit uplink information in the flexible subframe according to the subframe configuration indication information; and wherein the base station is further configured to receive, in response to the subframe configuration indication information indicating that the subframe direction to which the flexible subframe currently needs to be applied is downlink, the uplink information sent from the UE in another uplink subframe other than the flexible subframe in a TDD uplink-downlink subframe ratio indicated by the TDD uplink-downlink subframe configuration.

17. The system according to claim 16, wherein the subframe configuration indication information indicates the subframe direction to which the flexible subframe currently needs to be applied when the base station configures at least two TDD uplink-downlink subframe configurations for the UE; and wherein the subframe configuration indication information further indicates a TDD uplink-downlink subframe configuration that currently needs to be used.

18. The system according to claim 17, wherein the at least two TDD uplink-downlink subframe configurations comprise a first uplink-downlink subframe configuration and a second uplink-downlink subframe configuration; and wherein the flexible subframe corresponds to a subframe which is configured as an uplink subframe in the first uplink-downlink subframe configuration and is configured as a downlink subframe in the second uplink-downlink subframe configuration.

* * * * *